US011979485B2

(12) United States Patent
Lee et al.

(10) Patent No.: US 11,979,485 B2
(45) Date of Patent: May 7, 2024

(54) ELECTRONIC DEVICE PROVIDING BLOCKCHAIN ACCOUNT INFORMATION AND METHOD OF OPERATING THE SAME

(71) Applicant: Samsung Electronics Co., Ltd., Suwon-si (KR)

(72) Inventors: Youna Lee, Suwon-si (KR); Sungjin Park, Suwon-si (KR); Dohyun Jo, Suwon-si (KR); Seungmin Ha, Suwon-si (KR); Seongmin Je, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 255 days.

(21) Appl. No.: 16/992,457

(22) Filed: Aug. 13, 2020

(65) Prior Publication Data

US 2021/0058233 A1    Feb. 25, 2021

(30) Foreign Application Priority Data

Aug. 23, 2019    (KR) .................. 10-2019-0104028

(51) Int. Cl.
*H04L 9/00*    (2022.01)
*G06F 21/60*    (2013.01)
(Continued)

(52) U.S. Cl.
CPC .......... *H04L 9/0637* (2013.01); *G06F 21/602* (2013.01); *H04L 9/30* (2013.01); *H04L 9/50* (2022.05); *H04L 2209/56* (2013.01)

(58) Field of Classification Search
CPC .................................. H04L 9/30; H04L 9/50
See application file for complete search history.

(56) References Cited

U.S. PATENT DOCUMENTS 9,077,828 B1 *   7/2015  Koster ............... G06Q 30/0267
10,491,404 B1 *  11/2019 Yamamoto ................ H04L 9/50
(Continued)

FOREIGN PATENT DOCUMENTS

| CN | 109660359 A | 4/2019 |
|---|---|---|
| CN | 109961276 A | 7/2019 |
| KR | 10-1944528 B1 | 2/2019 |

OTHER PUBLICATIONS

Dan-da hd-wallet-addrs Apr. 2, 2017 (retrieved using achrive.org) GitHub (Year: 2017).*

(Continued)

*Primary Examiner* — David J Pearson
(74) *Attorney, Agent, or Firm* — Jefferson IP Law, LLP

(57) ABSTRACT

An electronic device is provided. The electronic device includes a display, and a processor configured to generate at least one hierarchy deterministic path, obtain at least one public key using a root seed and the at least one hierarchy deterministic path, obtain a blockchain address for a blockchain account from the at least one public key, obtain information about the blockchain address from a blockchain network based on the blockchain address, the information about the blockchain address including information about a balance of the blockchain account, and display at least part of the information about the blockchain address through the display, based on the information about the balance of the blockchain account.

21 Claims, 18 Drawing Sheets

(51) Int. Cl.
  *H04L 9/06* (2006.01)
  *H04L 9/30* (2006.01)

(56) References Cited

U.S. PATENT DOCUMENTS

| | | | |
|---|---|---|---|
| 10,990,941 B1* | 4/2021 | DeVan | G06Q 20/3672 |
| 11,303,433 B2 | 4/2022 | Kong | |
| 2015/0262176 A1 | 9/2015 | Langschaedel et al. | |
| 2015/0324789 A1 | 11/2015 | Dvorak et al. | |
| 2018/0075453 A1 | 3/2018 | Durvasula et al. | |
| 2018/0191503 A1* | 7/2018 | Alwar | H04L 9/14 |
| 2018/0288022 A1 | 10/2018 | Madisetti et al. | |
| 2019/0036919 A1 | 1/2019 | Andrade | |
| 2019/0066228 A1 | 2/2019 | Wright | |
| 2019/0228386 A1* | 7/2019 | Onnainty | H04L 9/0643 |
| 2019/0245680 A1 | 8/2019 | Boutaba et al. | |
| 2019/0305943 A1* | 10/2019 | Hoersten | H04L 9/0894 |
| 2019/0354963 A1* | 11/2019 | Di Iorio | G06Q 20/3678 |
| 2019/0362340 A1* | 11/2019 | Strong | G06Q 20/065 |
| 2021/0083872 A1* | 3/2021 | Desmarais | G06Q 20/3825 |
| 2021/0264410 A1* | 8/2021 | Paek | H04L 9/0825 |

OTHER PUBLICATIONS

BIP 32 https://github.com/bitcoin/bips/blob/master/bip-0032.mediawiki Retrieved through archive.org from Mar. 23, 2018 (Year: 2018).*
Antonopoulos Mastering Bitcoin O'Reilly pp. 81-98 (Year: 2014).*
Bips / bip-0044.mediawiki, Palatinus et al, Multi-Account Hierarchy for Deterministic Wallets, Apr. 9, 2019.
Harsha Goli, "HD Wallets Explained: From High Level to Nuts and Bolts", Mar. 13, 2018, pp. 1-2.
International Search Report dated Nov. 17, 2020, issued in International Patent Application No. PCT/KR2020/011157.
Extended European Search Report dated Jul. 19, 2022, issued in European Patent Application No. 20859405.1.
Chinese Office Action dated Mar. 12, 2024, issued in Chinese Patent Application No. 202080059679.5.

* cited by examiner

ELECTRONIC DEVICE PROVIDING BLOCKCHAIN ACCOUNT INFORMATION AND METHOD OF OPERATING THE SAME

CROSS-REFERENCE TO RELATED APPLICATION(S)

This application is based on and claims priority under 35 U.S.C. § 119(a) of a Korean patent application number 10-2019-0104028, filed on Aug. 23, 2019, in the Korean Intellectual Property Office, the disclosure of which is incorporated by reference herein in its entirety.

BACKGROUND

1. Field

The disclosure relates to an electronic device providing blockchain account information and a method of operating the same. More particularly, the disclosure relates to automatically generating hierarchy deterministic paths regardless of the level type of the hierarchy deterministic path for deriving the public key corresponding to the address for the blockchain account from the root seed and provide blockchain account information for the root seed

2. Description of Related Art

Since blockchain-based bitcoin has been made public, blockchain has applications in various sectors, such as smart contract-based platform services, cloud storage services, blockchain computing services, as well as cryptocurrency systems, e.g., bitcoin.

A blockchain platform allows system participants (nodes) to distribute and store data in their respective blocks, and thus it is substantially free from data forgery and falsification (reliability) and allows the participants to own their distributed information (transparency) with no need for a separate central server manager. User information and an encryption key are required to retain, transmit/receive, and transact cryptocoins associated with blockchain technology, and this is implemented with a blockchain e-wallet.

Blockchain e-wallet encryption technology is divided into symmetric encryption and asymmetric encryption. An example symmetric encryption scheme unlocks the encrypted information when the identification (ID) and password match. Asymmetric encryption uses two keys, one private key for fully accessing the encrypted information and one public key symmetric, as symmetric with the private key, for authentication purposes. Most of blockchain-based e-wallets adopt asymmetric encryption.

Despite its convenient functions, blockchain e-wallets are put at risk of loss, exposure, or hacking and may be inconvenient to those familiar with financial services of the related art.

Many blockchain-based cryptocurrencies observe bitcoin improvement proposal (BIP)-32, as an algorithm to derive or obtain a private key and a public key to identify the cryptocurrency account from the root seed. The core of BIP-32 is that the private key and public key derived from the root seed are identical all the time. BIP-44 defines a scheme for implementing BIP-32 and proposes a five-level hierarchy deterministic (HD) path as a method for deriving or obtaining a private key and public key from the root seed. However, the BIP-44 specifications are not mandatory and each e-wallet maker may use a different level of hierarchy deterministic path that does not follow BIP-44. In theory, all public keys may be derived or obtained by using the same hierarchy deterministic path with the same root seed. Identifying the cryptocurrency account with the above-described technique is known as HD wallet. For example, types of wallets are divided into nondeterministic wallets and deterministic wallets. HD wallets have been developed to generate various keys from the same seed. HD wallets have keys generated in a tree structure. Parent keys and child keys may be created from the tree structure, and grandchild keys may be created from child keys. In this way, an infinite number of keys may be theoretically created. The biggest reason for using HD wallets is that several keys may be created and managed to address the transparency and security issues of blockchain.

Root seed is one basic value from which many keys and addresses may be created. The keys belonging to the whole hierarchy deterministic wallet may be restored through the root seed. As the root seed, the mnemonic word sequence is used more frequently. For example, the root seed may generate a master private key and master chain code from the hash value generated through the hash-based message authentication code (HMAC)-secure hash algorithm (SHA) 512 algorithm function. Among the 512 bits of the hashed value, the left 256 bits may be used as the private key, and the right 256 bits as the chain code. The public key may be obtained from the private key using an elliptic curve function. As such, the private key and public key and even the blockchain address may be derived through the root seed.

The HD wallets of the related art may not identify the cryptocurrency account that has been used, if the level type of the hierarchy deterministic path (e.g., HD wallet key identifier path) necessary during the course of deriving the public key from the root seed differs per hierarchy deterministic wallet maker.

The hierarchy deterministic path (HD wallet key identifier) may be identified using 'path,' a naming rule. In the above-described tree address relationship included in the HD wallet, the tree levels may be differentiated by slashes (/).

Although selection of a hierarchy deterministic path may be left to the user, hierarchy deterministic paths have a structure hard for normal users to identify, and use of the HD wallet is uncomfortable.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device for automatically generating hierarchy deterministic paths regardless of the level type of the hierarchy deterministic path for deriving the public key corresponding to the address for the blockchain account from the root seed and provide blockchain account information for the root seed.

Additional aspects will be set forth in part in the description which follows and, in part, will be apparent from the description, or may be learned by practice of the presented embodiments.

In accordance with an aspect of the disclosure, an electronic device is provided. The electronic device includes a display, and a processor configured to generate at least one hierarchy deterministic path, obtain at least one public key using a root seed and the at least one hierarchy deterministic path, obtain a blockchain address for a blockchain account from the at least one public key, obtain information about the blockchain address from a blockchain network based on the blockchain address, the information about the blockchain address including information about a balance of the blockchain account, and display at least part of the information about the blockchain address through the display, based on the information about the balance of the blockchain account.

In accordance with another aspect of the disclosure, a method for operating an electronic device is provided. The method includes generating at least one hierarchy deterministic path, obtaining at least one public key using a root seed and the at least one hierarchy deterministic path, obtaining a blockchain address for a blockchain account from the at least one public key, obtaining information about the blockchain address from a blockchain network based on the blockchain address, the information about the blockchain address including information about a balance of the blockchain account, and displaying at least part of the information about the blockchain address through a display of the electronic device, based on the information about the balance of the blockchain account.

In accordance with another aspect of the disclosure, an electronic device is provided. The electronic device includes a display and a processor configured to obtain a first public key using a root seed and a first hierarchy deterministic path, obtain a second public key using the first public key and a second hierarchy deterministic path, obtain a blockchain address using the second public key, obtain information about the blockchain address from a blockchain network based on the blockchain address, the information about the blockchain address including information about a balance of the blockchain address, and provide at least one of the information about the blockchain address through the display, based on the information about the balance of the blockchain address.

In accordance with another aspect of the disclosure, an electronic device is provided. The electronic device includes a display and a processor configured to generate at least one first hierarchy deterministic path that may be derived from a root seed, obtain at least one first public key from the root seed, using the at least one first hierarchy deterministic path, transmit the at least one first public key to a server to obtain at least one blockchain address for a blockchain account from the at least one first public key, obtain information about the blockchain account corresponding to the at least one blockchain address from the server, and display at least part of the information about the blockchain account through the display.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in connection with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
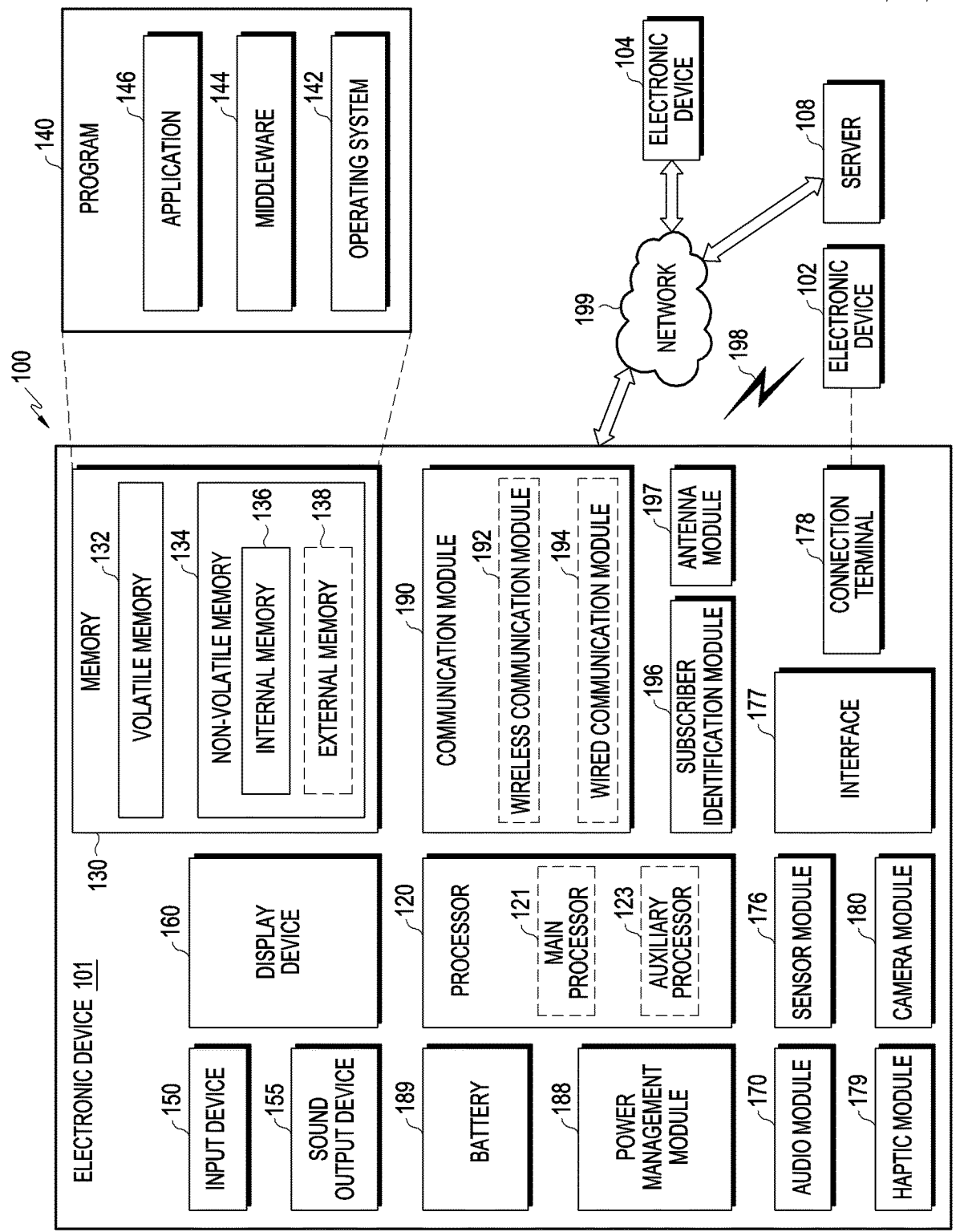
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
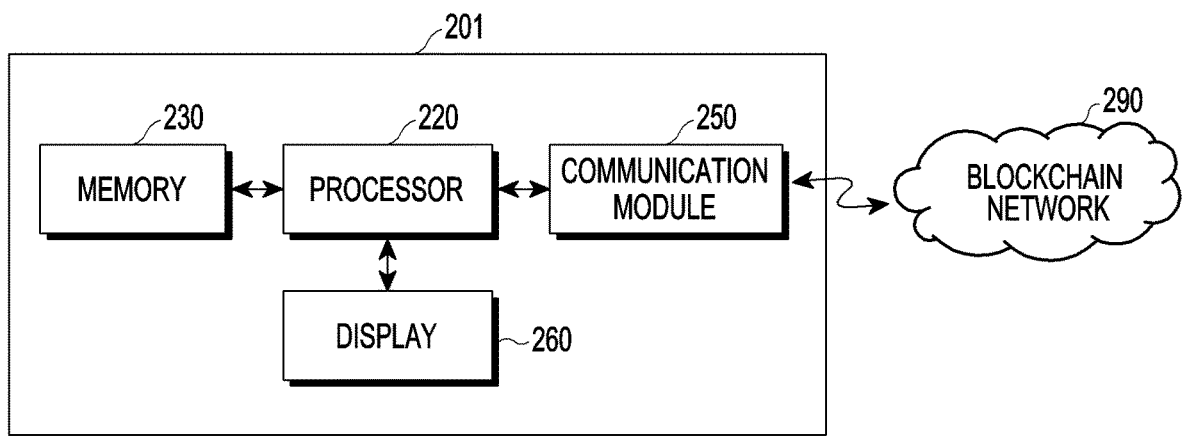
FIG. 2 is a block diagram schematically illustrating an electronic device according to an embodiment of the disclosure.

FIG. 2 is a block diagram schematically illustrating an electronic device according to an embodiment of the disclosure.

Referring to FIG. 2, an electronic device 201 may include a processor 220, a memory 230, a communication module 250, and a display 260. For example, the electronic device 201 may be implemented to be substantially the same or similar to the electronic device 101 or 102 of FIG. 1. For example, the electronic device 201 may perform an e-wallet (e.g., Cold Wallet) function.

According to an embodiment of the disclosure, the processor 220 may control the overall operation of the electronic device 201. For example, the processor 220 may generate a hierarchy deterministic (HD) path to derive (or obtain) a blockchain account (or address) from a blockchain root seed. For example, the hierarchy deterministic path may include information indicating a path or method for deriving (or obtaining) a public key corresponding to the blockchain account (or address) from the root seed.

According to an embodiment, the processor 220 may (automatically) generate a plurality of hierarchy deterministic paths that may be derived from a specific root seed. For example, when a blockchain signature application is executed, the processor 220 may generate a plurality of hierarchy deterministic paths that may be derived for a specific root seed stored in the memory 230. For example, the plurality of hierarchy deterministic paths may include paths with the same level (or depth) and/or different levels (or depths).

According to an embodiment, the processor 220 may (automatically) generate a first path corresponding to a first area (e.g., an area corresponding to one to three levels) that may be derived only with a private key for the root seed and a second path corresponding to a second area (e.g., an area corresponding to four and five levels or an area corresponding to four levels) that may be derived even with a public key. For example, the hierarchy deterministic path capable of deriving a specific blockchain address may be a mixed path of the first path and the second path. For example, when the blockchain signature application is executed, the processor 220 may generate the first path, which may be derived only with a private key for the root seed stored in the memory 230, and generate the second path that may be derived even with a public key. For example, the processor 220 may obtain or derive a blockchain address using the generated first path and second path.

According to an embodiment, the processor 220 may obtain a plurality of public keys that may be derived from a specific root seed stored in the memory 230, using a plurality of hierarchy deterministic paths. For example, the processor 220 may derive a private key from the root seed and obtain a plurality of public keys using the private key. For example, the processor 220 may obtain a parent public key and a plurality of child public keys from the private key, using the plurality of hierarchy deterministic paths.

According to an embodiment, the processor 220 may obtain a plurality of addresses for the blockchain account, using the plurality of public keys. For example, the processor 220 may obtain a corresponding account number (or account address) using each of the plurality of child public keys.

According to an embodiment, the processor 220 may identify whether each of a plurality of addresses is a valid account in the blockchain network, through the communication module 150. For example, the processor 220 may request the blockchain network 290 to identify whether the accounts corresponding to the plurality of addresses are valid, through the communication module 250. For example, valid account may mean that the account has a transaction history or a balance. In other words, the processor 220 may identify whether the plurality of addresses are valid through a plurality of nodes included in the blockchain network.

According to an embodiment, according to the identification request from the electronic device 201, the blockchain network 290 may identify whether the account corresponding to the corresponding address is valid through the plurality of nodes included in the blockchain network 290. For example, the blockchain network 290 may be a network group including a plurality of nodes. The plurality of nodes may share and manage blockchain information through the network between the nodes.

According to an embodiment, the processor 220 may identify whether the corresponding blockchain address is valid based on at least one of information about the balance of the blockchain address (or account) and count information related to the transaction of the blockchain address. For example, the count information related to the transaction of the blockchain address may include the number of transactions (e.g., the number of remittances and/or the number of deposits) for the blockchain address and information about the transaction history (e.g., the remittance history and/or deposit history).

According to an embodiment, the processor 220 may obtain information about the account (blockchain address) from the blockchain network 290 through the communication module 250. The account (blockchain address) information may include information about, e.g., a kind of coin, a credit balance, a balance, a transaction history (e.g., the remittance and/or deposit history), a number of transactions (e.g., the number of remittances and/or deposits), latest transaction information, a transaction type (e.g., currency, item, or token), and/or a maker hint (e.g., a hint about what an e-wallet maker the corresponding account has been created through). The processor 220 may identify whether the account is valid based on the account information. For example, when there is no transaction history for the account, the processor 220 may determine that the account is invalid. In other words, when there is a transaction history for the account, the processor 220 may determine that the account is valid. When there is a remaining balance for the account, the processor 220 may determine that the account is valid.

According to an embodiment, the processor 220 may display at least part of the account information (or blockchain address information) obtained from the blockchain network 290, through the display 260. For example, the processor 220 may display at least part of the blockchain address information based on the blockchain address information (e.g., the balance and transaction history (e.g., a deposit and a remittance history) for the blockchain account) and the number of transactions (e.g., the number of remittances and/or the number of deposits)). The processor 220 may display at least part of the blockchain address information based on the balance information for the blockchain address (or account) included in the blockchain address information. In other words, the processor 220 may select (or sort out) only part of the account information obtained from the blockchain network 290 and display the selected information as the information about the account corresponding to the blockchain address. For example, the display 260 may be implemented to be substantially the same or similar to the display device 160 of FIG. 1.

According to an embodiment, the processor 220 may generate and display additional information using the account information (or blockchain address information) obtained from the blockchain network 290. For example, the additional information may be new information generated by processing the account information obtained from the blockchain network 290. For example, the additional information may include maker information inferred (or determined) based on the account information obtained from the blockchain network 290. The additional information may include, e.g., the last date of transaction for the account obtained from the blockchain network 290, a transmission type (e.g., information indicating whether the object transacted is currency or a token (or item)), and account information about the other party of the transaction. That is, the additional information may be information different from the obtained account information. For example, the processor 220 may generate (or obtain) the additional information by processing the account information obtained from the blockchain network 290 and display the generated additional information through the display. For example, the processor 220 may display the additional information along with the account information. Or, the processor 220 may display the additional information before or after displaying the account information.

According to an embodiment, the processor 220 may store a root seed in the memory 230. For example, the root seed may be stored in a secure area of the memory 230. For example, the memory 230 may be implemented to be substantially the same or similar to the memory 130 of FIG. 1. According to an embodiment, the processor 220 may store the root seed in a memory (not shown) (or an external electronic device) outside the electronic device 201.

According to an embodiment, the electronic device 201 may further include at least one of an auxiliary processor (not shown) and a non-volatile memory (not shown). For example, the auxiliary processor may be implemented to be the same or similar to the auxiliary processor 123 of FIG. 1. For example, the auxiliary processor may control blockchain-related functions and store blockchain-related information (or data) in the non-volatile memory. Or, the electronic device 201 may further include only the auxiliary processor and may store blockchain-related information (or data) in the secure area of the memory 230. In other words, the auxiliary processor may perform at least one some of the operations of the processor 220 described herein.

Figure 3A:
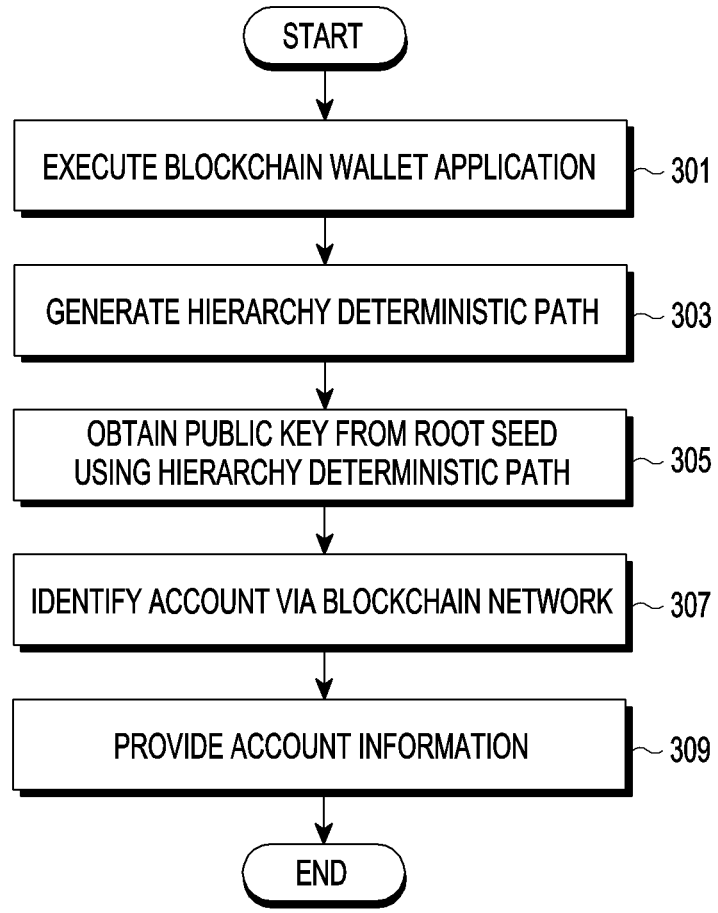
FIGS. 3A, 3B, and 3C are views illustrating a method of operating an electronic device to provide blockchain account information according to various embodiments of the disclosure.
Figure 3B:
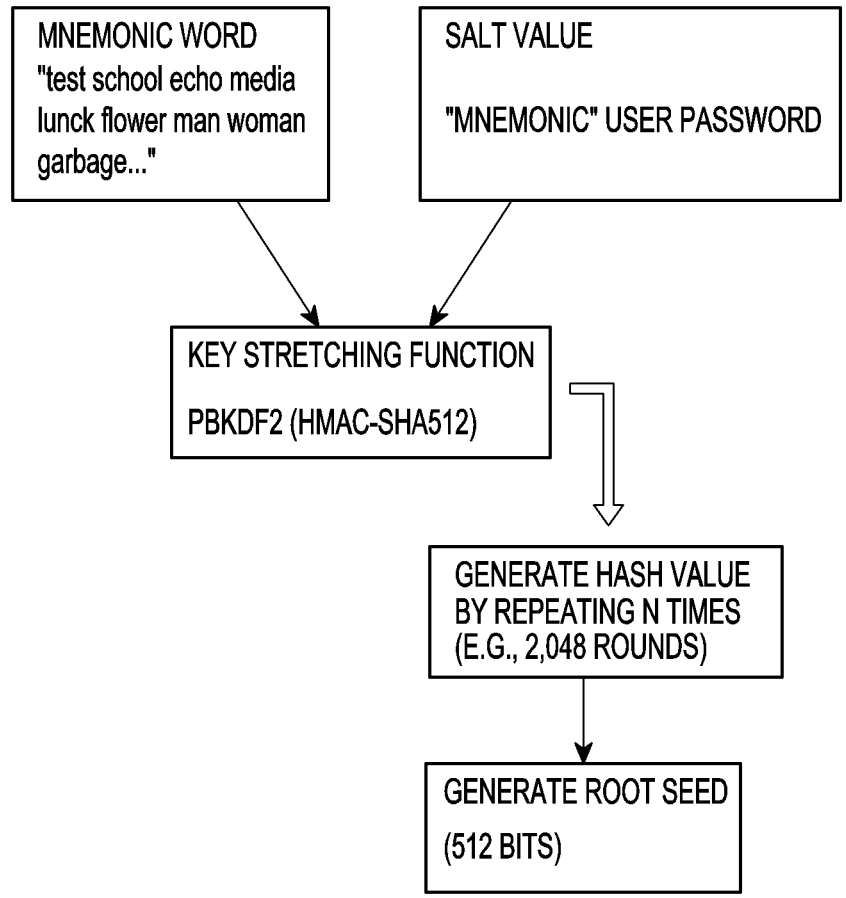
Figure 3C:

FIGS. 3A, 3B, and 3C are views illustrating a method of operating an electronic device to provide blockchain account information according to various embodiments of the disclosure.

Referring to FIG. 3A, at operation 301, an electronic device (e.g., the electronic device 201 of FIG. 2) may execute a blockchain wallet application. For example, the electronic device 201 may execute the blockchain wallet application for identifying the blockchain account information according to the user's input.

According to an embodiment, the blockchain wallet application may access the user's cryptocurrency, manage the key and address, identify the credit balance, and generate and sign transactions. According to an embodiment, the user's cryptocurrency may be recorded on the blockchain by the nodes attended through the blockchain network. The blockchain wallet application may include a private key and public keys to generate the transaction to be included in the blockchain. The user may transmit/receive the user's coins (or cryptocurrency) by signing the transaction with the user's private key via the blockchain wallet application.

At operation 303, the electronic device 201 may generate a plurality of hierarchy deterministic paths for the root seed stored in the memory (e.g., the memory 230 of FIG. 2). For example, when the blockchain wallet application is executed, the electronic device 201 may generate a plurality of hierarchy deterministic paths for the root seed via the blockchain wallet application. For example, the plurality of hierarchy deterministic paths may include a path of the five levels following the BIP-44 rule and a path of other levels (e.g., four levels) not following the BIP-44 proposal. For example, the blockchain signature application may be an application that stores and/or manages the root seed.

According to an embodiment, the blockchain signature application may be implemented separately from the blockchain wallet application or be included in the blockchain wallet application. For example, when the blockchain signature application is included in the blockchain wallet application, the blockchain wallet application may perform the functions (or roles) of the blockchain signature application.

According to an embodiment, the root seed may use various types of seeds. For example, the root seed may use a seed of a hexadecimal number or a seed composed of a 12-word mnemonic. In this case, the mnemonic may include a word format that may be perceived by the user. For example, the root seed may use a BIP-39 standard-based mnemonic. The mnemonic code and seed may be generated based on the BIP-39 standard.

Referring to FIG. 3B, according to an embodiment, a method of generating a root seed using a mnemonic may be performed as follows. The salt value (e.g., the password entered by the user) and the words included in the mnemonic, as factors, and a key stretching function may be used to generate a 512-bit seed. The key stretching function (e.g., password-based key derivation function 2 (PBKDF2)) may output a constant (512-bit) value using the two factor values. For example, the key stretching function may repeatedly perform hashing on the two factor values using a hash algorithm (e.g., hash-based message authentication code (HMAC)-secure hash algorithm (SHA) 512) and generate the final output value as a seed.

At operation 305, the electronic device 201 may obtain a plurality of public keys corresponding to a plurality of addresses for the blockchain account from the root seed using the plurality of hierarchy deterministic paths. For example, the electronic device 201 may obtain a plurality of public keys from the root seed using the plurality of hierarchy deterministic paths, through the blockchain signature application. Further, the electronic device 201 may obtain a plurality of addresses for the blockchain account based on the plurality of public keys.

Referring to FIG. 3C, a method (e.g., based on three depths) of generating (or obtaining) the address for the cryptocurrency using the factor values of the hierarchy deterministic path (HD path) defined in the standard BIP-44 and the seed key generated based on the standard BIP-39 may be performed, based on the standard BIP-32.

In the method of generating the address for the cryptocurrency, as the depths deepen, the factor value of the child key derivation function (CKD) corresponding to the next value may continue to add. For example, upon going from 0 depth over to 1 depth, CKD (m,0) may be used and, when one depth is further deepened (e.g., upon going from 1 depth to 2 depths), CKD (m,0,0) may be used. For example, the child key derivation (CKD) function may use an HMAC-SHA512 hash function as follows.

Child Key Derivation Function~CKD$(x,n)$=HMAC-SHA512$(x_{chain}, x_{hubkey} \| n)$ At operation 307, the electronic device 201 may identify at least one blockchain account (or blockchain address) through the blockchain network. The electronic device 201 may obtain information about a plurality of addresses (e.g., a plurality of public addresses) through operation 305. The plurality of addresses may be a plurality of accounts, respectively, for the blockchain. The electronic device 201 may access the blockchain network using each of the plurality of addresses and identify a valid account from among the plurality of accounts on the blockchain network. For example, the electronic device 201 may identify the public address based on the public key obtained at operation 305 and identify information about the public address on the blockchain network, using the public address. For example, the blockchain network may provide a means (e.g., api) that may identify the blockchain account information (e.g., the transaction history or balance corresponding to the public address) using the public address. When there is a transaction history (or transaction record) for the corresponding account on the blockchain network, the electronic device 201 may determine that the account is a valid account. Or, when there is a transaction history within a specific period for the corresponding account on the blockchain network, the electronic device 201 may determine that the account is a valid account. For example, the presence of a transaction history may mean not simply the presence of a financial transaction but also such an occasion where the account is used by the user so that specific information is contained. According to an embodiment, when the account information obtained from the blockchain network is an address acknowledged to be reliable (e.g., a specific exchange address or an address authenticated by an organization), the electronic device 201 may determine that the account is a valid one. According to an embodiment, when there is a balance for the corresponding account in the blockchain network, the electronic device 201 may determine that the account is a valid account.

At operation 309, the electronic device 201 may determine the validity for the account based on information about at least one account (e.g., balance information) through the blockchain network and provide information about the account determined to be valid. The electronic device 201 may provide information about the account determined to be valid (e.g., information about the balance of the account, transaction history (remittance and deposit history), and/or the number of transactions (the number of remittances and/or the number of deposits)). For example, the electronic device 201 may manage at least one valid account separately depending on the kind of coin. The electronic device 201 may obtain information about, e.g., the balance, credit balance, transaction history (e.g., remittance and/or deposit history), the number of transactions (e.g., the number of remittances and/or the number of deposits), latest transaction information, and/or maker hit, for the valid account depending on the kind of coin.

Figure 4A:
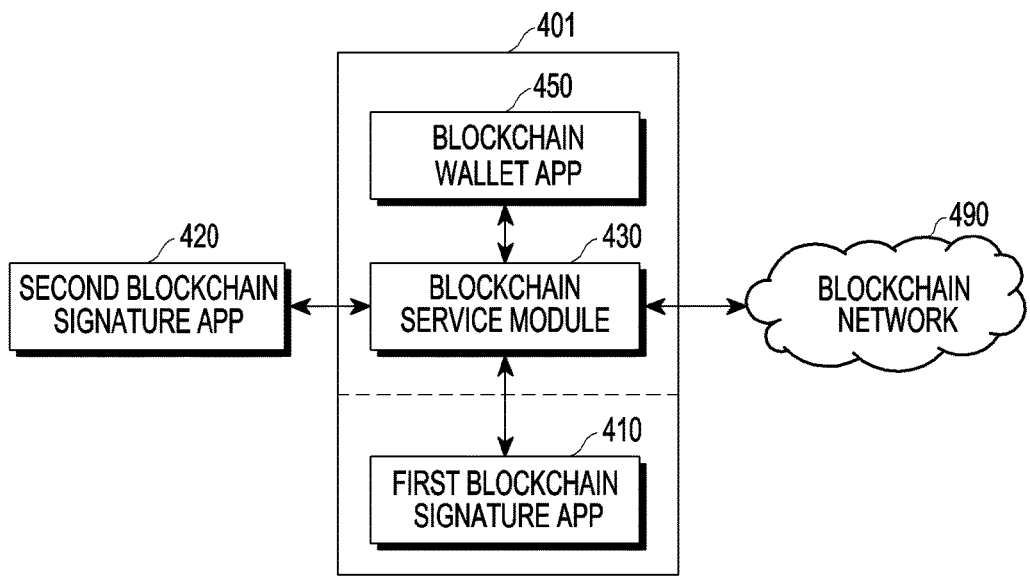
FIG. 4A is a block diagram illustrating an electronic device in a network environment according to an embodiment of the disclosure.

FIG. 4A is a block diagram illustrating an electronic device in a network environment according to an embodiment of the disclosure. FIG. 4C is a view illustrating a hierarchy deterministic path according to an embodiment of the disclosure.

Referring to FIG. 4A, an electronic device 401 may execute a first blockchain signature application 410, a blockchain service module 430, and a blockchain wallet application 450, by a processor (e.g., the processor 220 of FIG. 2). For example, the first blockchain signature application 410, the blockchain service module 430, and the blockchain wallet application 450 may be applications stored in the electronic device 401. According to an embodiment, the first blockchain signature application 410, the blockchain service module 430, and the blockchain wallet application 450 may be implemented in one blockchain wallet application 450.

According to an embodiment, the first blockchain signature application 410 may manage or store the root seed. The first blockchain signature application 410 may generate a plurality of hierarchy deterministic paths that may be derived from a single root seed.

According to an embodiment, the first blockchain signature application 410 may obtain a private key from the root seed using each of the plurality of hierarchy deterministic paths, which may be derived from the root seed, and obtain a public key from the private key. The first blockchain signature application 410 may transmit the public key to the blockchain service module 430. For example, the first blockchain signature application 410 may transmit per-coin parent public keys derived (or obtained) from the root seed to the blockchain service module 430. For example, the first blockchain signature application 410 may be an application stored or embedded in the electronic device 401. The first blockchain signature application 410 may be an application that may separately store the private key in a secure area of the electronic device and manage the private key. According to an embodiment, the first blockchain signature application 410 may be a security-reinforced application that may be executed only on a separate secure operating system or secure kernel, may logically or physically separate a portion of the memory (e.g., the memory 230 of FIG. 2) off and configure the portion as a secure area (e.g., a trusted execution environment (TEE)), and may store and manage the private key in the secure area. According to an embodiment, the first blockchain signature application 410 may store the key in a memory outside the electronic device and support an additional authentication operation to allow the key stored in the outside memory to be used via separate authentication. According to an embodiment, the first blockchain signature application 410 may be executed on a normal operating system or non-secure area (e.g., a rich execution environment (REE)), managing the private key.

According to an embodiment, a second blockchain signature application 420 may perform the same function as the first blockchain signature application 410. However, unlike the first blockchain signature application 410, the second blockchain signature application 420 may not be stored or embedded in the electronic device 401. For example, the second blockchain signature application 420 may be an application that is stored or embedded in an external device. For example, when the external device is connected to the electronic device 401, and there is a request from the blockchain service module 430, the second blockchain signature application 420 may transmit the public key to the blockchain service module 430. The second blockchain signature application 420 may transmit the parent public key to the blockchain service module 430, identify blockchain addresses generated based on the parent public key, and identify a list of the blockchain addresses. For example, the second blockchain signature application 420 may transmit per-coin parent public key (e.g., the highest public key) derived (or obtained) from the root seed to the blockchain service module 430. For example, the highest public key may mean a public key which is generated based on the private key generated from the root seed of the hierarchy deterministic (HD) wallet and is the highest public key in the hierarchical structure (e.g., a tree structure).

According to an embodiment, the blockchain service module 430 may obtain the public key (e.g., the parent public key) from the first blockchain signature application 410 or the second blockchain signature application 420. The blockchain service module 430 may derive (or obtain) a public key (e.g., the child public key) for restoring the address corresponding to the blockchain account from the public key (e.g., the parent public key) obtained from the blockchain signature application 410 or 420 using any one of the plurality of hierarchy deterministic paths.

Referring to FIG. 4C, the blockchain signature application 410 or 420 may obtain the public key (parent public key) based on the area which may be derived only with the private key or the same area per maker, and since the remaining hierarchy deterministic (HD) path (e.g., depth 4) and its subsequent HD path may be derived even with the public key, and whether it is used is varied depending on the maker, it may derive the child public key while changing the factor values of depths 4 and 5 corresponding to the remaining hierarchy deterministic paths. For example, the blockchain signature application 410 or 420 may sequentially increase the 'account_index' of depth 5 to derive the child public key. The blockchain signature application 410 or 420 may generate a blockchain address per coin, using the derived public key. The generated blockchain address may be verified for its validity via the blockchain network, and the blockchain signature application 410 or 420 may store a list of blockchain addresses determined to be valid.

For example, in the operation of identifying the validity of the blockchain addresses, the blockchain service module 430 may identify the balance and/or transaction history of the per-coin addresses via the blockchain network 490. For example, the blockchain service module 430 may request the blockchain network 490 to identify the balance and/or transaction history of the address. When there is a balance and/or transaction history for the address, the account may be determined to be a valid account and, when there is no balance and/or transaction history for the address, the account may be determined to be an invalid account. The blockchain service module 430 may obtain a valid account list and valid account information. According to an embodiment, the blockchain service module 430 may be implemented as a service development kit (SDK).

According to an embodiment, the blockchain wallet application 450 may obtain the valid account information from the blockchain service module 430 to identify a valid account from among the accounts that may be generated from the root seed. The blockchain service module 430 may identify information about (e.g., transaction information) the blockchain address corresponding to the account through the blockchain network 490. For example, the blockchain service module 430 may identify the balance or transaction history based on the blockchain address and, when there is a balance or transaction history, determine that the account corresponding to the blockchain address is a valid account.

According to an embodiment, the blockchain wallet application 450 may display the valid account information through a display (e.g., the display 260 of FIG. 2). For example, the valid account may mean an account that has the user's transaction history (e.g., within a specific period). Or, the valid account may mean an account that has a balance for the corresponding blockchain address. According to an embodiment, the blockchain wallet application 450 may be an application that performs the hierarchy deterministic (HD) wallet function.

Figure 4B:
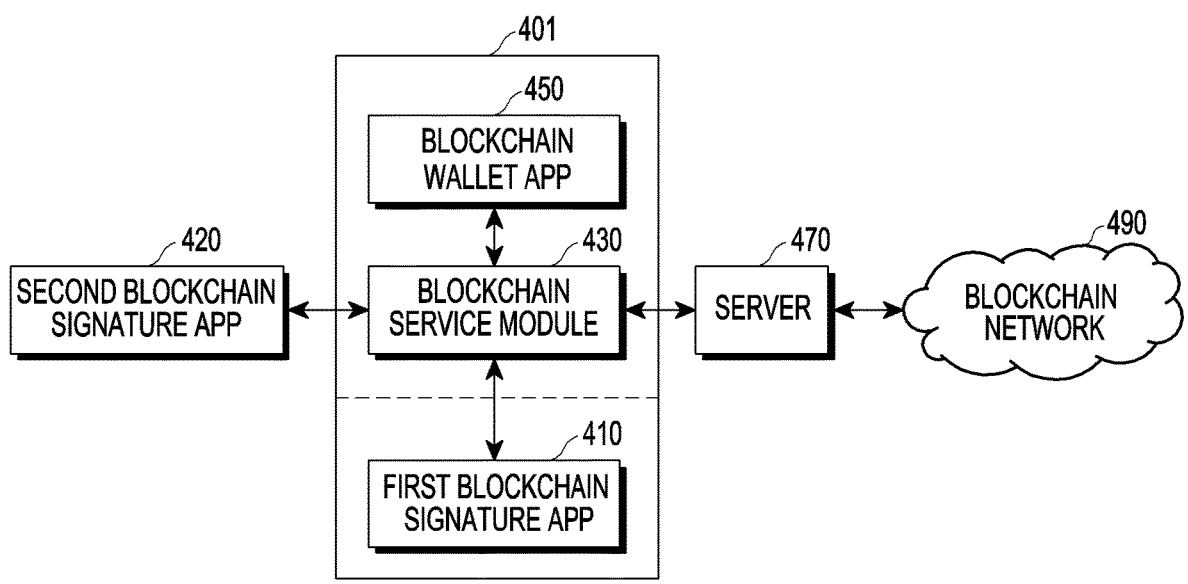
FIG. 4B is a block diagram illustrating an electronic device in a network environment according to an embodiment of the disclosure.
Figure 4C:
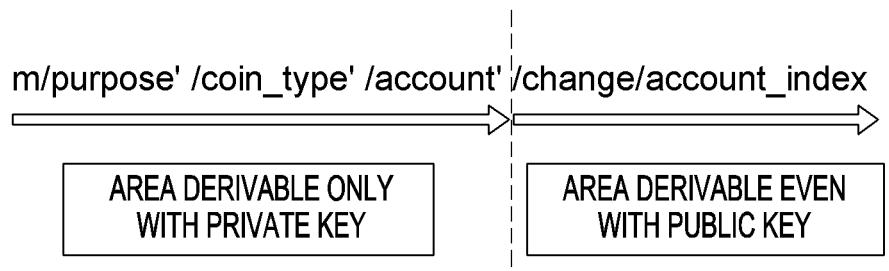
FIG. 4C is a view illustrating a hierarchy deterministic path according to an embodiment of the disclosure.

FIG. 4B is a block diagram illustrating an electronic device in a network environment according to an embodiment of the disclosure.

Referring to FIG. 4B, as compared with the system of FIG. 4A, the system of FIG. 4B may further include a server 470.

According to an embodiment, the server 470 may perform at least some of the operations performed by the blockchain service module 430 of FIG. 4A. Thus, in FIG. 4B, the operations performed by the blockchain service module 430 may partially differ from the operations of FIG. 4A. In contrast, the operations of the blockchain signature application 410 and 420, blockchain wallet application 450, and blockchain network 490 of FIG. 4B may be the same as those of FIG. 4A.

According to an embodiment, the blockchain service module 430 may obtain the parent public key from the first blockchain signature application 410 or the second blockchain signature application 420. The blockchain service module 430 may derive (or obtain) a lower-step parent public key from the parent public key (e.g., the highest parent public key) obtained from the blockchain signature application 410 or 420 using any one of the plurality of hierarchy deterministic paths. The blockchain service module 430 may transmit the derived parent public key to the server 470.

According to an embodiment, the server 470 may derive (or obtain) the child public key of the final step to restore the address corresponding to the blockchain account from the parent public key obtained from the blockchain service module 430, using any one of the plurality of hierarchy deterministic paths. The server 470 may generate (or obtain) per-coin addresses from the derived child public key.

According to an embodiment, the blockchain service module 430 may obtain a parent public key per coin, using some (e.g., HD paths from depth 0 to depth 3) of the plurality of hierarchy deterministic paths. The blockchain service module 430 may transmit the obtained parent public key to the server 470. The server 470 may derive a public key to be finally used, using the remaining paths (e.g., HD paths from depth 4 to depth 5) of the plurality of hierarchy deterministic paths, based on the obtained parent public key. For example, in the case of depth 4 (change) among the hierarchy deterministic paths, the corresponding parameter may not be used, and the corresponding parameter setting value may be varied depending on makers. According to an embodiment, the server 470 may identify variations in the market and apply variations to the setting value and manage the same. In the case of depth 5 (account index) among the hierarchy deterministic paths, the server 470 may derive the public key by increasing the corresponding parameter one by one, starting from 0.

The server 470 may derive (or obtain) the child public key of the final step to restore the address corresponding to the blockchain account from the parent public key obtained from the blockchain service module 430. The server 470 may generate (or obtain) per-coin addresses from the derived final public key. According to an embodiment, the hierarchy deterministic wallet (HD wallet) may obtain the child public key from the parent public key using the child key derivation function (CKD).

According to an embodiment, the server 470 may obtain (or identify) information about the address per coin, via the blockchain network 490. For example, the blockchain service module 430 may request the blockchain network 490 to identify the balance, number of transactions (e.g., the number of remittances and/or the number of deposits), and/or transaction history (e.g., a remittance history and/or a deposit history) of the address. When there is a balance, number of transactions, and/or transaction history for the address, the account may be determined to be a valid account and, when there is no balance, number of transactions, and/or transaction history for the address, the account may be determined to be an invalid account. The blockchain service module 430 may obtain a valid account list and valid account information (e.g., information about the balance, credit balance, number of transactions, and/or transaction history). The server 470 may transmit the valid account list and valid account information to the blockchain service module 430. The blockchain service module 430 may transmit the valid account information to the blockchain wallet application 450.

According to an embodiment, the server 470 may obtain other information than the account information (e.g., information about the balance, credit balance, number of transactions, and/or transaction history) obtained through the blockchain network. For example, the server 470 may obtain detailed information about a specific account by monitoring the transaction of the blockchain account. The detailed information may be information about the date of last transaction for a specific account, transaction target address information, and transaction type (e.g., currency, item, or token). The server 470 may transmit the obtained detailed information to the electronic device 401 (e.g., the blockchain service module 430).

Figure 5:
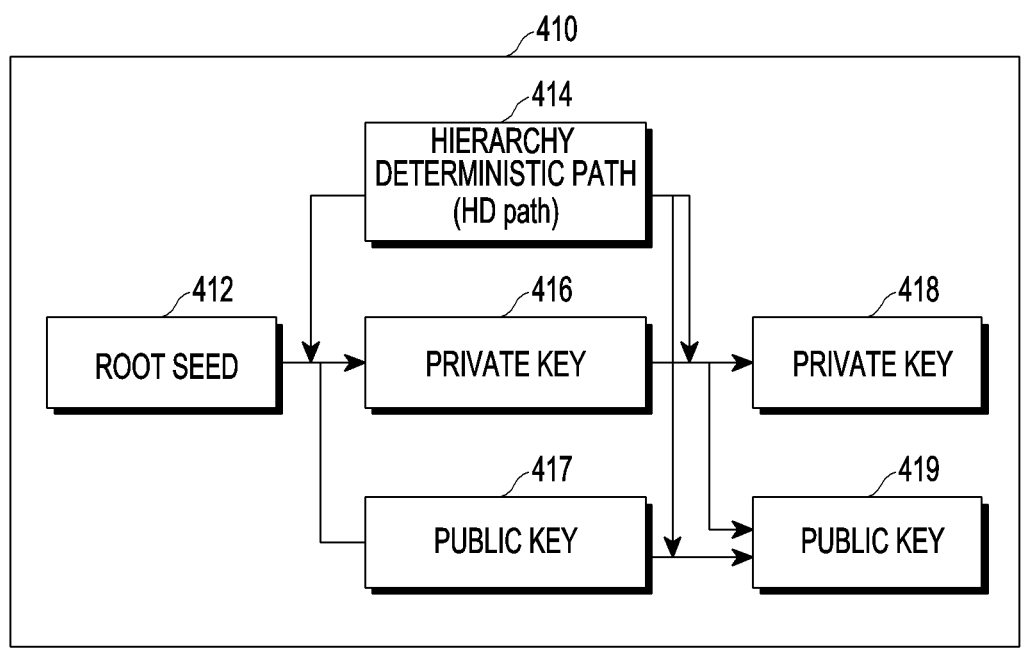
FIG. 5 is a block diagram illustrating operations of a blockchain signature module according to an embodiment of the disclosure.

FIG. 5 is a block diagram illustrating operations of a blockchain signature module according to an embodiment of the disclosure.

Referring to FIG. 5, the blockchain signature application 410 may store and manage a root seed 412. For example, the blockchain signature application 410 may store the root seed 412 in a memory (e.g., the memory 230 of FIG. 2) and manage the same.

According to an embodiment, the blockchain signature application 410 may generate a plurality of hierarchy deterministic paths 414 that may be derived from the root seed 412. For example, the blockchain signature application 410 may generate the hierarchy deterministic paths 414 of the cases that may be derived from the root seed 412. According to an embodiment, the blockchain signature application 410 may derive (or obtain) a private key 416 and public key 417 from the root seed 412, using at least one of the plurality of hierarchy deterministic paths. For example, the public key 417 may be the highest parent public key. For example, at least one hierarchy deterministic path may be determined by selecting the parameter assigned to the corresponding depth in the hierarchy deterministic (HD) path of a key pair created with the private key. Further, the blockchain signature application 410 may derive (or obtain) a private key 418 and public key 419 from the private key 416, using at least one of the plurality of hierarchy deterministic paths. That is, the blockchain signature application 410 may obtain a key pair, the private key 418 and the public key 419. For example, the public key 419 may be the child public key of the highest parent public key.

According to an embodiment, in the operation of deriving the private key from the root seed, the private key and chain code may be generated from the value resultant from hashing the root seed using a hash algorithm (e.g., HMAC-SHA512). The hashed value is generated in 512 bits, and the left 256 bits of the hashed value may be used as the private key while the right 256 bits may be used as the chain code. The public key may be generated by applying a predetermined function (e.g., an elliptic curve function) to the private key.

According to an embodiment, the blockchain signature application 410 may transmit the public key 419 to the blockchain service module (e.g., the blockchain service module 430 of FIGS. 4A and 4B). For example, the root seed 412 and the private key 416 may not be transmitted to the blockchain service module 430 while the public key 419 alone may be transmitted to the blockchain service module 430. For example, the blockchain signature application 410 may obtain a plurality of public keys using a plurality of hierarchy deterministic paths 414 that may be derived from the root seed 412 and may transmit the obtained public keys to the blockchain service module 430.

Although FIG. 5 illustrates that the blockchain signature application 410 separate from the blockchain wallet application 450 performs the corresponding operations, the blockchain wallet application 450 and the blockchain signature application 410 may be integrated to perform the corresponding operations, according to an embodiment. For example, the blockchain wallet application 450 may incorporate the blockchain signature application 410 to perform the operations described above in connection with FIG. 5.

Figure 6:
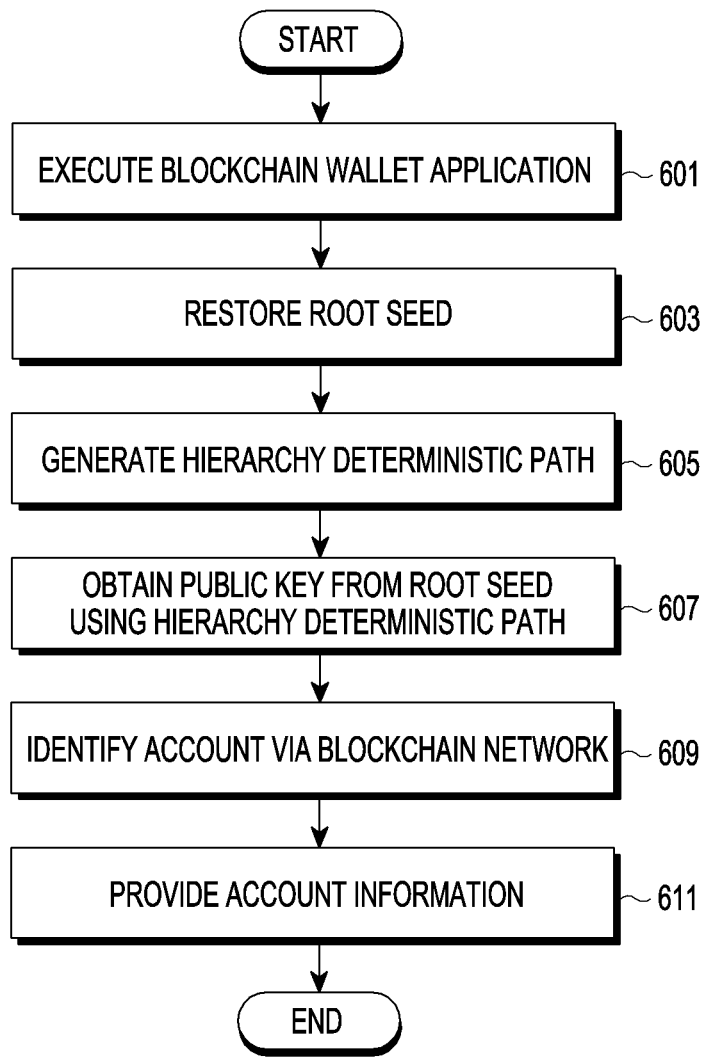
FIG. 6 is a flowchart illustrating a method of operating an electronic device to provide blockchain account information for a root seed according to an embodiment of the disclosure.

FIG. 6 is a flowchart illustrating a method of operating an electronic device to provide blockchain account information for a root seed according to an embodiment of the disclosure.

Referring to FIG. 6, the blockchain signature application 410 and the blockchain wallet application 450 may be implemented as one application. Or, the blockchain signature application 410 and the blockchain wallet application 450 may be separate applications from each other.

Referring to FIG. 6, at operation 601, an electronic device (e.g., the electronic device 401) may execute the blockchain wallet application 450.

At operation 603, the electronic device 401 may restore (and store) the root seed. The electronic device 401 may receive a specific mnemonic word and restore the root seed 412 corresponding to the mnemonic word. For example, when the electronic device 401 is a newly purchased one or the electronic device 401 is operated first since a factory reset, the electronic device 401 may restore the root seed using the blockchain wallet application 450 (or the blockchain signature application 410). For example, the electronic device 401 may identify whether there is a preexisting root seed using the blockchain wallet application and, if any, identify whether to restore the root seed. The electronic device 401 may restore the root seed in response to selecting of an object for restoring the root seed provided from the blockchain wallet application 450 entered by the user. Or, the electronic device 401 may restore (and store) the root seed, which used to be used by another blockchain signature application 420, using the blockchain signature application 410. For example, the electronic device 401 may receive a specific mnemonic word and restore (or obtain) the root seed corresponding to the mnemonic word. For example, the electronic device 401 may restore the root seed, which used to be used by the other blockchain signature application 420 (e.g., Nano S), using the blockchain signature application 410 (e.g., Samsung blockchain Keystore).

At operation 605, the electronic device 401 may generate a plurality of hierarchy deterministic paths that may be derived from the restored root seed, using a blockchain wallet application (or blockchain signature application 410). For example, the electronic device 401 may (automatically) generate a first path corresponding to a first area (e.g., an area corresponding to one to three levels) that may be derived only with a private key for the root seed and a second path corresponding to a second area (e.g., an area corresponding to four and five levels or an area corresponding to four levels) that may be derived even with a public key. Further, the electronic device 401 may generate a hierarchy deterministic path for a specific blockchain account through the first path and the second path.

At operation 607, the electronic device 401 may obtain a plurality of public keys that may obtain the blockchain account from the root seed using a plurality of hierarchy deterministic paths. For example, the electronic device 401 may obtain the parent public key from the root seed, using any one (e.g., a value from depth 0 to depth 4) among the plurality of hierarchy deterministic paths, by the blockchain signature application 410. The electronic device 401 may obtain the child public key corresponding to the blockchain account (or address) from the parent public key, using the hierarchy deterministic path, by the blockchain service module 430.

At operation 609, the electronic device 401 may identify the address for the blockchain account based on the child public key and identify the account corresponding to the address via the blockchain network. For example, the electronic device 401 may identify whether the account corresponding to the address is valid via the blockchain network. Upon determining that the account is valid, the electronic device 401 may obtain information about the account. For example, the operation of determining that the account is valid may use a function (e.g., API) provided to determine the validity of the account on the blockchain network. For example, when the blockchain address, as the parameter, is transmitted to the API, such as "ethGetTransactionCount" in the Ethereum network, the electronic device 401 may identify the validity of the account corresponding to the blockchain address based on information obtained from the API.

At operation 611, the electronic device 401 may provide information about the valid account through a user interface of the blockchain wallet application 450. Further, the electronic device 401 may update the valid account information.

Figure 7A:
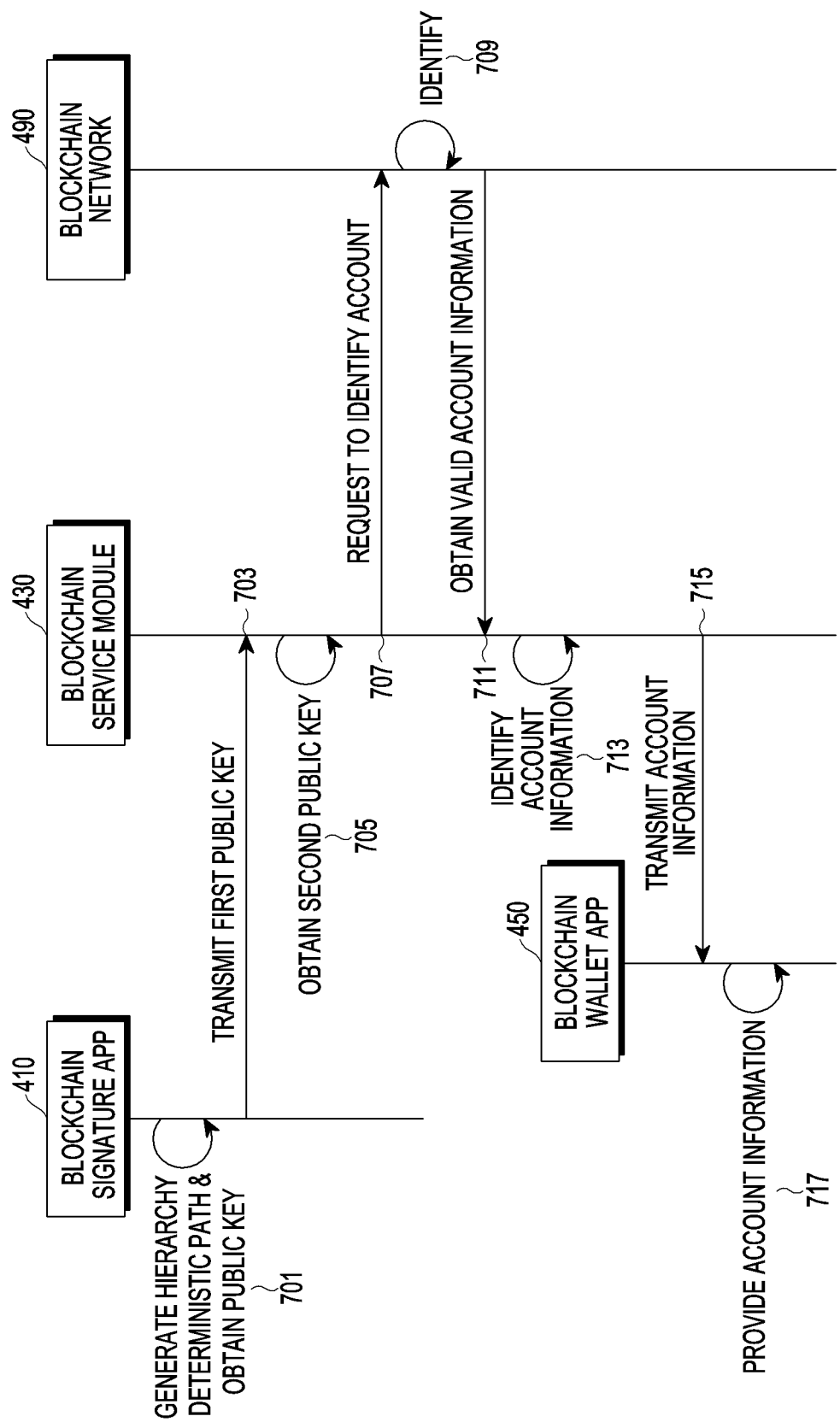
FIGS. 7A and 7B illustrate data flows for describing a method of operating an electronic device to provide blockchain account information for a root seed according to various embodiments of the disclosure.
Figure 7B:
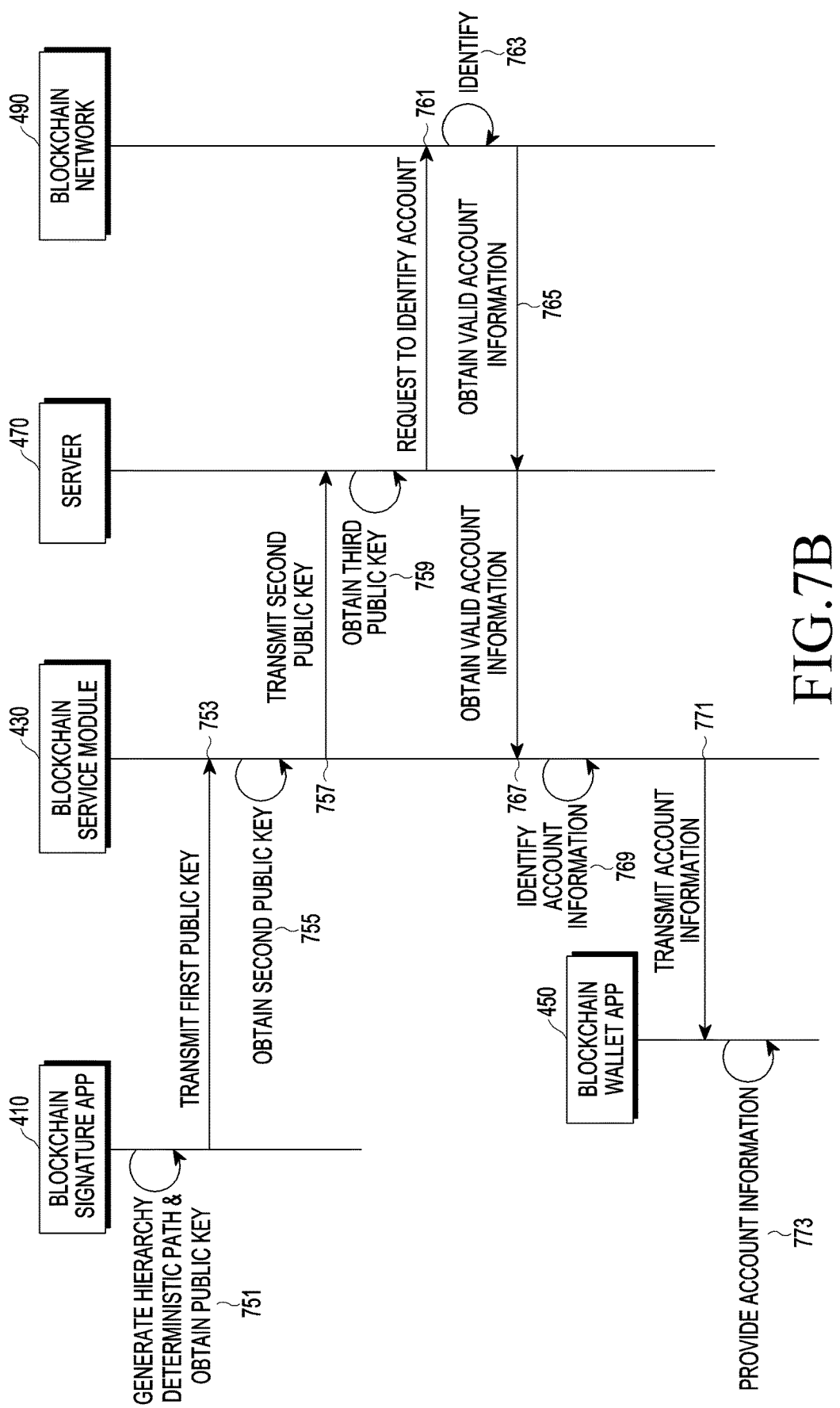

FIGS. 7A and 7B illustrate data flows for describing a method of operating an electronic device to provide blockchain account information for a root seed according to various embodiments of the disclosure.

FIG. 7A illustrates data flows for specifically describing the method of operating the electronic device 401 as described above in connection with FIG. 4A.

Referring to FIG. 7A, at operation 701, the blockchain signature application 410 may generate a plurality of hierarchy deterministic paths that may be derived from a root seed. The blockchain signature application 410 may obtain a private key from the root seed using any one of the plurality of hierarchy deterministic paths, which may be derived from the root seed, and obtain a first public key from the private key. For example, the first public key may be the parent public key corresponding to the highest step in the hierarchy deterministic path.

At operation 703, the blockchain signature application 410 may transmit the first public key to the blockchain service module 430.

At operation 705, the blockchain service module 430 may derive (or obtain) a second public key for restoring the address corresponding to the blockchain account from the blockchain first public key, using the hierarchy deterministic path. For example, the blockchain service module 430 may obtain the second public key which is the child key of the first public key, using the child key derivation function (CKD). For example, the second public key may be the child public key corresponding to the last step in the hierarchy deterministic path. Further, the blockchain service module 430 may generate (or obtain) the address corresponding to the blockchain account from the second public key.

At operation 707, the blockchain service module 430 may request the blockchain network 490 to identify the transaction history of the account corresponding to the address.

At operation 709, the blockchain network 490 (or a plurality of nodes included in the blockchain network) may identify the transaction history of the account corresponding to the address. When there is a transaction history for the address, the blockchain network 490 may determine that the account is a valid account and, when there is no transaction history for the address, the blockchain network 490 may determine that the account is an invalid account.

At operation 711, the blockchain service module 430 may obtain a valid account list and valid account information from the blockchain network 490. At operation 713, the blockchain service module 430 may identify the valid account information. For example, the valid account information may include, e.g., the credit balance, a transaction history, a number of transactions, a latest transaction information, and/or a maker hint.

At operation 715, the blockchain wallet application 450 may receive or obtain the valid account information transmitted from the blockchain service module 430. At operation 717, the blockchain wallet application 450 may provide or display the valid account information through a display (e.g., the display 260 of FIG. 2). For example, the blockchain wallet application 450 may provide information about what type of hierarchy deterministic path the valid account has been derived (or obtained) or what maker the valid account has been opened by. For example, the blockchain wallet application 450 may display whether the account is one derived from the hierarchy deterministic path of five levels or the hierarchy deterministic path of four levels.

FIG. 7B illustrates data flows for specifically describing the method of operating the electronic device 401 as described above in connection with FIG. 4B according to an embodiment of the disclosure.

Referring to FIG. 7B, at operation 751, the blockchain signature application 410 may generate a plurality of hierarchy deterministic paths that may be derived from a single root seed. The blockchain signature application 410 may obtain a private key from the root seed using any one of the plurality of hierarchy deterministic paths, which may be derived from the root seed, and obtain a first public key from the private key. For example, the first public key may be the parent public key corresponding to the highest step in the hierarchy deterministic path.

At operation 753, the blockchain signature application 410 may transmit the first public key to the blockchain service module 430.

At operation 755, the blockchain service module 430 may derive (or obtain) a second public key of a lower step from the blockchain first public key, using the hierarchy deterministic path. For example, the second public key may be the child public key corresponding to three levels in the hierarchy deterministic path of five levels as proposed in BIP-44.

At operation 757, the blockchain service module 430 may transmit the second public key to the server 470.

At operation 759, the server 470 may derive (or obtain) a third public key of the final step for restoring the address corresponding to the blockchain account from the second public key, using the hierarchy deterministic path. Further, the server 470 may generate (or obtain) the address corresponding to the blockchain account from the third public key.

At operation 761, the blockchain service module 430 may request the blockchain network 490 to identify the transaction history of the account corresponding to the address.

At operation 763, the blockchain network 490 (or a plurality of nodes included in the blockchain network) may identify the transaction history of the account corresponding to the address. When there is a transaction history for the address, the blockchain network 490 may determine that the account is a valid account and, when there is no transaction history for the address, the blockchain network 490 may determine that the account is an invalid account.

At operation 765, the server 470 may obtain a valid account list and valid account information from the blockchain network 490. At operation 767, the blockchain service module 430 may obtain a valid account list and valid account information from the server 470. At operation 769, the blockchain service module 430 may identify the valid account information.

At operation 771, the blockchain wallet application 450 may receive or obtain the valid account information transmitted from the blockchain service module 430. At operation 773, the blockchain wallet application 450 may provide or display the valid account information through a display (e.g., the display 260 of FIG. 2).

Although FIGS. 7A and 7B illustrate that the blockchain signature application 410 separate from the blockchain wallet application 450 performs specific operations, the blockchain wallet application 450 and the blockchain signature application 410 may be integrated to perform the operations, according to an embodiment. For example, the blockchain wallet application 450 may incorporate the blockchain signature application 410 to perform the operations (e.g., the operations of the blockchain signature application 410) described above in connection with FIGS. 7A and 7B.

Figure 8A:
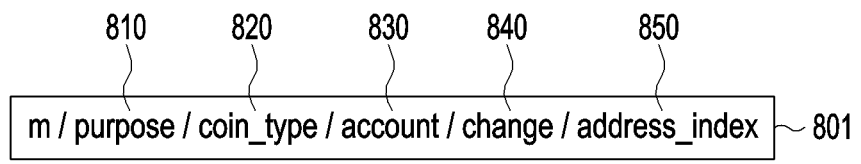
FIG. 8A is a view illustrating a path of five levels as per BIP-44 according to an embodiment of the disclosure.

FIG. 8A is a view illustrating a path of five levels as per BIP-44 according to an embodiment of the disclosure.

Referring to FIG. 8A, the hierarchy deterministic path 801 of five levels may include a first level 810 indicating "purpose," a second level 820 indicating "coin_type," a third level 830 indicating "account," a fourth level 840 indicating "change," and a fifth level 850 indicating "address_index."

According to an embodiment, the first level 810, i.e., "purpose," may indicate the specifications used. For example, when it is created by the BIP-44 specifications, the first level 810 may use 44'. The second level 820 may mean the coin type, and a value indicating the coin type may be determined (reserved) by the maker. For example, it may be determined that BTS (bitcoin)='0,' and ETH (Ethereum) ='60.' The coin type code used for each cryptocurrency may be set based on the SLIP0044 standard. The third level 830 indicating "account" may be used to distinguish receiving address and change address. The values may, or may not, be used depending on the kind of blockchain. For example, the bitcoin uses "account," but Ethereum may not use "account." The third level 830 may increase sequentially from 0 for the purpose of logically separating usage. The fourth level 840 is a parameter originating from the BTC, and substantially most of coins may have '0' set as a fixed value. The fifth level 850, "address_index" may mean the increasing address number. The fifth level 850 may sequentially increase from 0. As described above, each level may be set as a different value depending on the blockchain used or may be omitted.

According to an embodiment, the electronic device 201 or 401 may modify the second level value corresponding to "coin_type" per coin, among the values (or parameters)

corresponding to the five levels proposed in BIP-44 and increase, by the integer and sequentially from 0, the third level value corresponding to "account" and the fifth level value corresponding to "address_index," thereby geo-networking a plurality of hierarchy deterministic paths.

According to an embodiment, the electronic device 201 or 401 may increase, by the integer and sequentially from 0, the third level value corresponding to "account" and the fifth level value corresponding to "address_index" among the values (or parameters) corresponding to the five levels proposed in BIP-44, thereby identifying the valid account per coin.

Figure 8B:
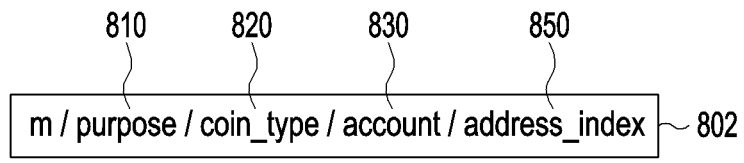
FIG. 8B is a view illustrating a path of four levels according to an embodiment of the disclosure.

FIG. 8B is a view illustrating a path of four levels according to an embodiment of the disclosure.

Referring to FIG. 8B, the hierarchy deterministic path 802 may exclude at least some of the five levels as per BIP-44. That is, depending on the maker of the blockchain signature application, a hierarchy deterministic path with all of the five levels or a hierarchy deterministic path (e.g., a hierarchy deterministic path of four levels as shown in FIG. 8B) with only some of the five levels (e.g., with the fourth level excluded as shown in FIG. 8B) may be used. Or, a hierarchy deterministic path including a level in addition to the five levels may be used depending on the maker of the blockchain signature application.

Figure 9A:
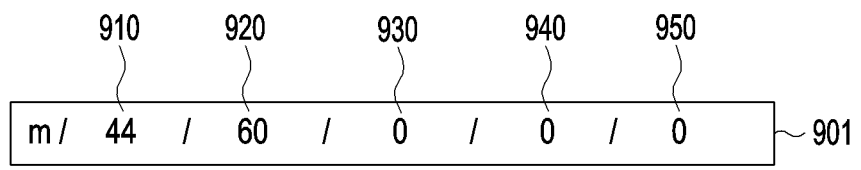
FIGS. 9A and 9B are views illustrating a method of identifying account information for a root seed based on a path of five levels as per BIP-44 according to various embodiments of the disclosure.
Figure 9B:
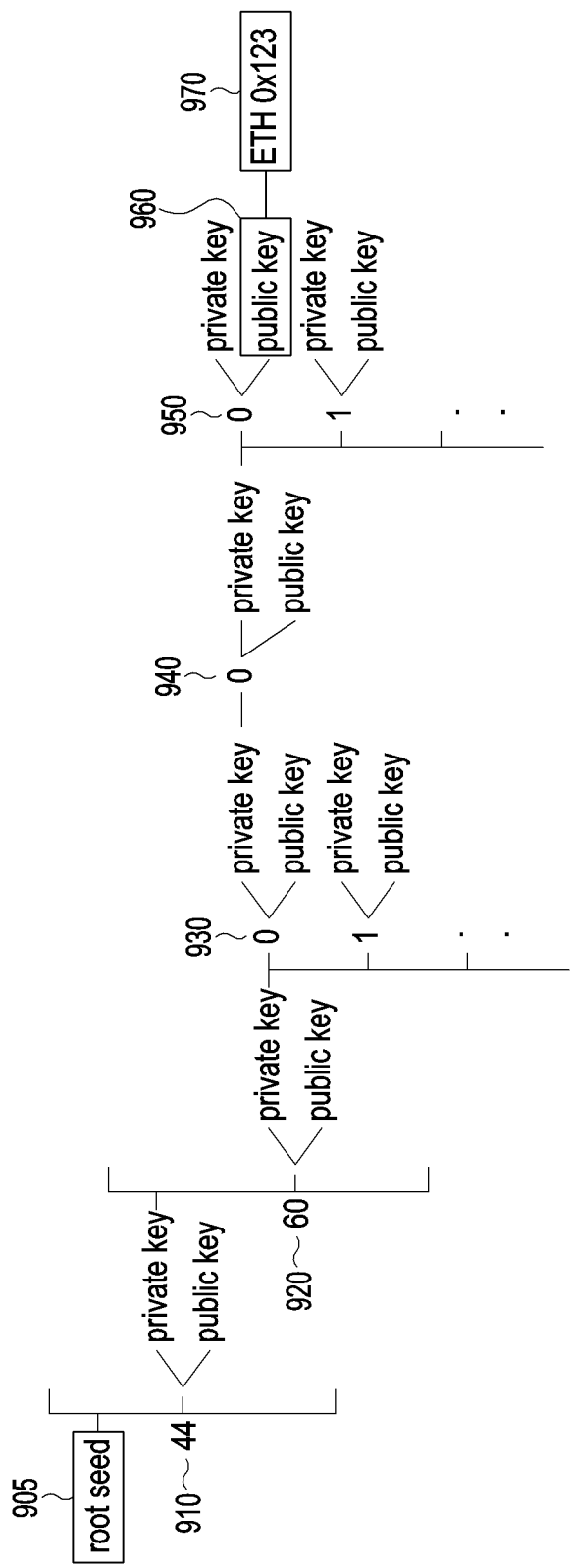

FIGS. 9A and 9B are views illustrating a method of identifying account information for a root seed based on a path of five levels as per BIP-44 according to various embodiments of the disclosure.

Referring to FIGS. 9A and 9B, the electronic device 201 or 401 may generate a plurality of hierarchy deterministic paths that may be derived from the root seed 905, using the blockchain signature application 410.

According to an embodiment, the hierarchy deterministic path 901 of FIG. 9A may be any one of the plurality of hierarchy deterministic paths. Referring to FIG. 9A, in the hierarchy deterministic path 901 of five levels, each level may have a different meaning depending on the specifications used. For example, the first level 910 may be set to 44' when created by the BIP-44 specifications. The second level 920 may be a value indicating the coin type. For example, when set to 60, this may indicate a hierarchy deterministic path of ETH (Ethereum). The third level 930, in the case of bitcoin, may be used to distinguish receiving address and change address or, depending on the kind of blockchain, it may not be used. The fourth level 940 is a parameter originating from the BTC, and substantially most of coins may have '0' set as a fixed value. The fifth level 950, i.e., address_index, may mean the address number that increases and may increase sequentially from 0. As described above, each level may be set as a different value depending on the blockchain used or may be omitted.

According to an embodiment, the blockchain signature application 410 executed on the electronic device 201 or 401 may generate public keys for deriving (or obtaining) the address corresponding to the blockchain account, using the hierarchy deterministic path 901.

According to an embodiment, the child key derivation (CKD) function may be used to derive public keys in the BIP-32 standard. At this time, as the factor values for the CKD, the input value entered in the hierarchy deterministic (HD) path, parent public key, and other various values may be used. The input value may be incremented by one depending on the level, and the next child key may be derived from the increased input value. For example, myriad key values may be generated depending on the factor values of the hierarchy deterministic (HD) path, like the child key is derived with CKD (m/0) at level 1, CKD (m/0/0) at the next level, i.e., level 2, CKD (m/0/0/1) at level 3, CKD (m/0/0/1/0) at level 4, ... CKD (m/0/0/0/k). Meanwhile, the scheme of creating the factor values of the hierarchy deterministic path as described herein is merely an example, and it is not limited to the BIP-32 standard, but various schemes of generating hierarchy deterministic (HD) paths may rather be adopted.

According to an embodiment, the electronic device 201 or 401 may derive a private key from the root seed 905 and derive a public key for the value, "44," of the first level 910 from the private key. The electronic device 201 or 401 may derive a public key for the value, "60," (which is a value indicating ETH (Ethereum)), of the second level 920 from the public key for the value, "44," of the first level 910. The electronic device 201 or 401 may derive a public key for a different value (e.g., "0" in the case of BTC (bitcoin)) from the value, "60," of the second level 920 from the public key for the value, "44," of the first level 910. However, the process in which the electronic device 201 or 401 derives the public key for the different value from "60" is omitted.

According to an embodiment, the electronic device 201 or 401 may derive a public key for the value, "0," of the third level 930 from the public key for the value, "60," of the second level 920. The electronic device 201 or 401 may sequentially increase, by the integer, the value of the third level 930 from the public key for the value, "60," of the second level 920 and derive a public key for the values (e.g., including "1" increased by one from "0") increased sequentially and by the integer. However, the process in which the electronic device 201 or 401 derives the public key for the different values from "0" is omitted.

According to an embodiment, the electronic device 201 or 401 may derive a public key for the value, "0," of the fourth level 940 from the public key for the value, "0," of the third level 930.

According to an embodiment, the electronic device 201 or 401 may derive a public key 960 for the value, "0," of the fifth level 950 from the public key for the value, "0," of the fourth level 940. The electronic device 201 or 401 may sequentially increase, by the integer, the value of the fifth level 950 from the public key for the value, "0," of the fourth level 940 and derive a public key for the values (e.g., including "1" increased by one from "0") increased sequentially and by the integer. However, the process in which the electronic device 201 or 401 derives the public key for the different values from "0" is omitted.

According to an embodiment, the electronic device 201 or 401 may obtain the address 970 corresponding to the blockchain account from the public key 960 for the value, "0," of the fifth level 950. For example, the address 970 may be obtained by applying a specific algorithm to the public key 960. For example, in the case of bitcoin, the specific algorithm may be an "Address=RIPEMD160(SHA256(public key))" algorithm. In the case of a bitcoin address, the electronic device 201 or 401 may generate an SHA256 hash with the public key and may again perform a RIPEMD160 hash to obtain a 160-bit bitcoin address.

According to an embodiment, the electronic device 201 or 401 may identify whether the account corresponding to the address 970 is valid via the blockchain network (e.g., 290 or 490).

As described above, the electronic device 201 or 401 may obtain a plurality of public keys from a root seed using a plurality of hierarchy deterministic paths and obtain addresses corresponding to the plurality of public keys. Further, the electronic device 201 or 401 may efficiently identify whether the accounts corresponding to the plurality of addresses are valid and information about the accounts.

According to an embodiment, in FIG. 7A, the public keys from the first level 910 to the fifth level 950 may be derived (or obtained) from the electronic device 401. In contrast, in FIG. 7B, the public keys from the first level 910 to the third level 930 may be derived (or obtained) from the electronic device 401, and the public keys subsequent to the third level 930, e.g., the public keys from the fourth level 940 to the fifth level 950, may be derived (or obtained) from the server 470. At this time, the server 470 may obtain the address 970 corresponding to the blockchain account from the public key 960 for the value, "0," of the fifth level 950 and may identify whether the account corresponding to the address 970 is valid via the blockchain network (e.g., 290 or 490). Further, the server 470 may transmit information about whether the account is valid and information about the valid account to the electronic device 401.

Figure 10A:
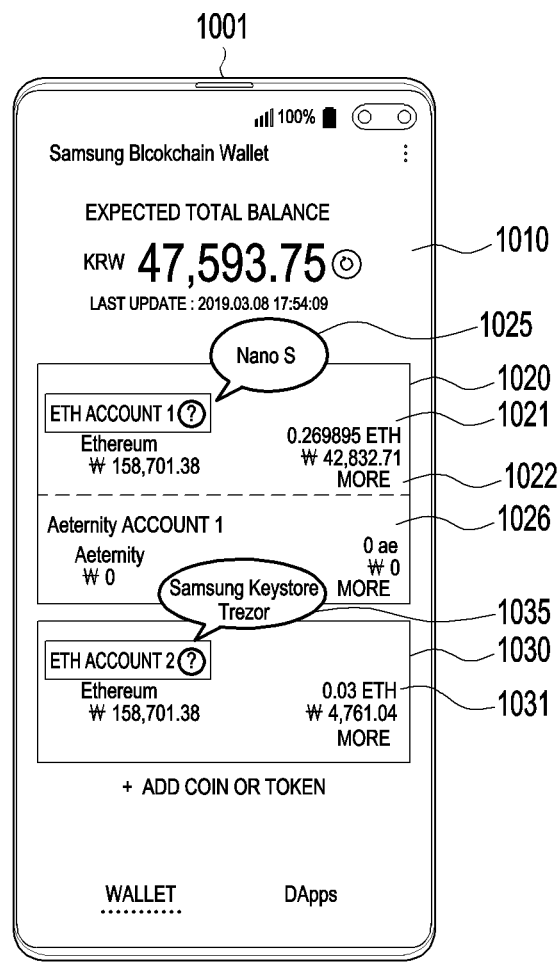
FIGS. 10A and 10B are views illustrating a user interface to provide blockchain account information for a root seed according to various embodiments of the disclosure.
Figure 10B:
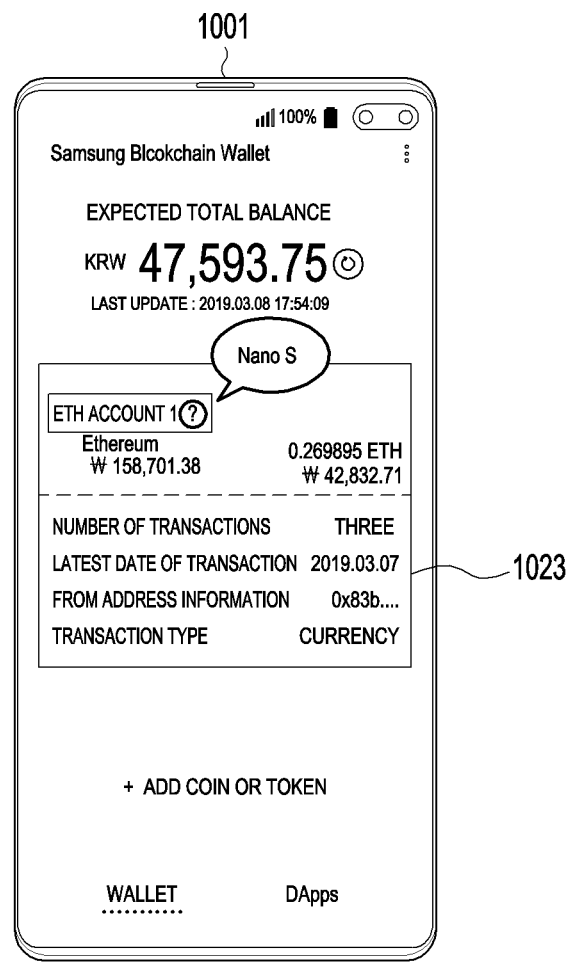

FIGS. 10A and 10B are views illustrating a user interface to provide blockchain account information for a root seed according to various embodiments of the disclosure.

Referring to FIG. 10A, an electronic device 1001 (e.g., the electronic device 201 or 401 of FIG. 2 or 4) may provide information about a blockchain account. For example, when a blockchain wallet application (e.g., the blockchain wallet application 450 of FIG. 4) is executed, the electronic device 1001 may provide blockchain account information through a user interface 1010 of the blockchain wallet application 450.

According to an embodiment, the user interface 1010 may provide information about the total credit balance included in all the accounts. For example, the user interface 1010 may provide the information about the total credit balance included in all the accounts considering the current per-coin market prices and account credit balance.

According to an embodiment, the user interface 1010 may provide information 1021 about ETH (Ethereum) account 1, information 1026 about Aeternity account 1, and information 1030 about ETH account 2. For example, ETH account 1 may be an account generated or imported from an external electronic device (e.g., 'Nano S') using a four-level hierarchy deterministic path, and ETH account 2 may be an account generated or imported from another blockchain application (e.g., Samsung 'Keystore' or 'Trezor') using a five-level hierarchy deterministic path. For example, Aeternity account 1 may be an account generated or imported from an external electronic device (e.g., 'Nano S') using a four-level hierarchy deterministic path.

According to an embodiment, the user interface 1010 may provide the credit balance, current coin price information, and price exchanged to a specific currency, for ETH (Ethereum) account 1, Aeternity account 1, and ETH account 2. Further, the user interface 1010 may provide maker hints 1025 and 1035 for ETH (Ethereum) account 1, Aeternity account 1, and ETH account 2. For example, since ETH account 1 has been derived using the four-level hierarchy deterministic path, a maker (Nano S) hint 1025 which uses the four-level hierarchy deterministic path may be provided. Since ETH account 2 has been derived using the five-level hierarchy deterministic path, a maker (Samsung Keystore or Trezor) hint 1035 which uses the five-level hierarchy deterministic path may be provided.

According to an embodiment, the user interface 1010 may group the accounts according to the level types of hierarchy deterministic paths. For example, the user interface 1010 may group ETH (Ethereum) account 1 and Aeternity account 1, which have been derived from the four-level hierarchy deterministic path, into a first group 1020 and group ETH account 2, which has been derived using the five-level hierarchy deterministic path, into a second group 1030.

Referring to FIGS. 10A and 10B, each piece of account information 1021, 1026, and 1031 may provide detailed information about each account. For example, in the information 1021 about ETH (Ethereum) account 1, when the user's touch input occurs on a detailed information object 1022, the electronic device 1001 may display detailed information 1023 about ETH (Ethereum) account 1. For example, the detailed information 1023 may include information about the number of transactions for the corresponding account, the last transaction history and/or date of transaction, address information (from address information) of transaction on the corresponding account, and transaction type information. For example, the detailed information 1023 may include information additionally obtained using the blockchain address information obtained from the blockchain network.

Although FIGS. 10A and 10B illustrate that the user interface 1010 provides only specific information about accounts for ease of description, the technical spirit of the disclosure is not limited thereto.

Figure 11:
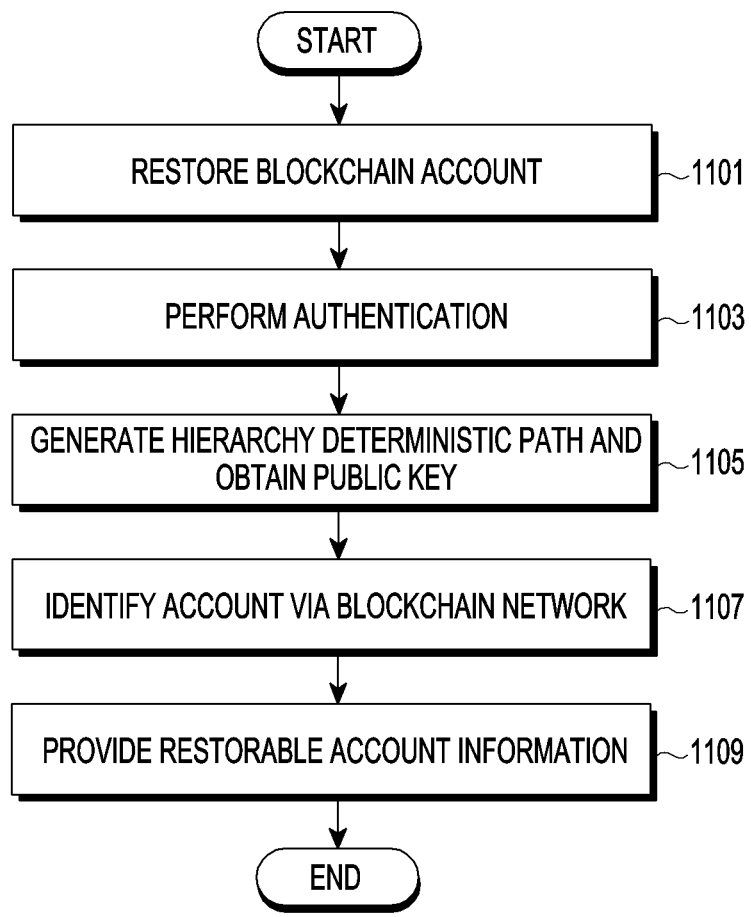
FIG. 11 is a flowchart illustrating a method of restoring a blockchain account for a root seed via authentication according to an embodiment of the disclosure.

FIG. 11 is a flowchart illustrating a method of restoring a blockchain account for a root seed via authentication according to an embodiment of the disclosure.

Referring to FIG. 11, according to an embodiment, at operation 1101, the electronic device 201 or 401 may perform the operation of restoring (or updating) a blockchain account. For example, when the blockchain wallet application 450 is executed, the electronic device 201 or 401 may start the operation of identifying the blockchain account that may be restored from the root seed.

At operation 1103, before the restoring operation, the electronic device 201 or 401 may perform an authentication operation. For example, the electronic device 201 or 401 may compare pre-registered biometric information and/or pin number with biometric information and/or pin number entered from the user to thereby perform the authentication operation. According to an embodiment, the user may restore the root seed based on the mnemonic. The electronic device 201 or 401 may restore the addresses generated based on the root seed, based on the hierarchy deterministic path, at operation 1105, using the restored root seed.

At operation 1105, when authentication is complete, the electronic device 201 or 401 may generate hierarchy deterministic paths that may be driven with the root seed. Further, the electronic device 201 or 401 may derive (or obtain) a plurality of public keys to obtain addresses corresponding to the blockchain account using the hierarchy deterministic paths. The electronic device 201 or 401 may obtain a plurality of addresses using the plurality of public keys.

At operation 1107, the electronic device 201 or 401 may identify a valid account among the accounts corresponding to the plurality of addresses via the blockchain network. Further, the electronic device 201 or 401 may obtain information about at least one valid account (e.g., the credit balance, latest transaction time, transaction history (e.g., remittance and/or deposit history), number of transactions (e.g., the number of remittances and/or the number of deposits), kind of coin, and/or kind of wallet (application) where the account has been opened.

At operation 1109, the electronic device 201 or 401 may provide the user with information about restorable blockchain accounts. The user may restore the blockchain account using the electronic device 201 or 401, by referring to the information about restorable blockchain accounts.

Figure 12A:
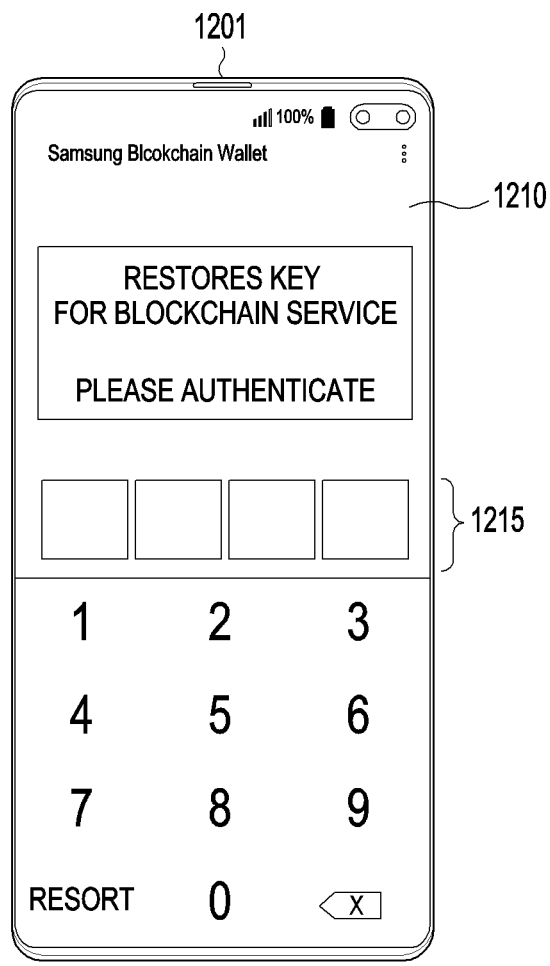
FIGS. 12A, 12B, and 12C illustrate a user interface for describing a method of restoring a blockchain account for a root seed via authentication according to various embodiments of the disclosure.
Figure 12B:
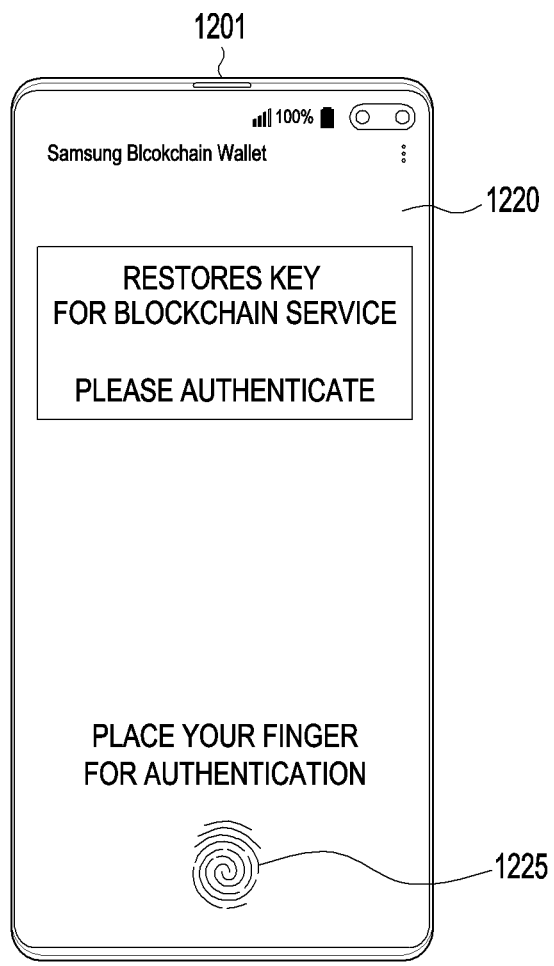
Figure 12C:
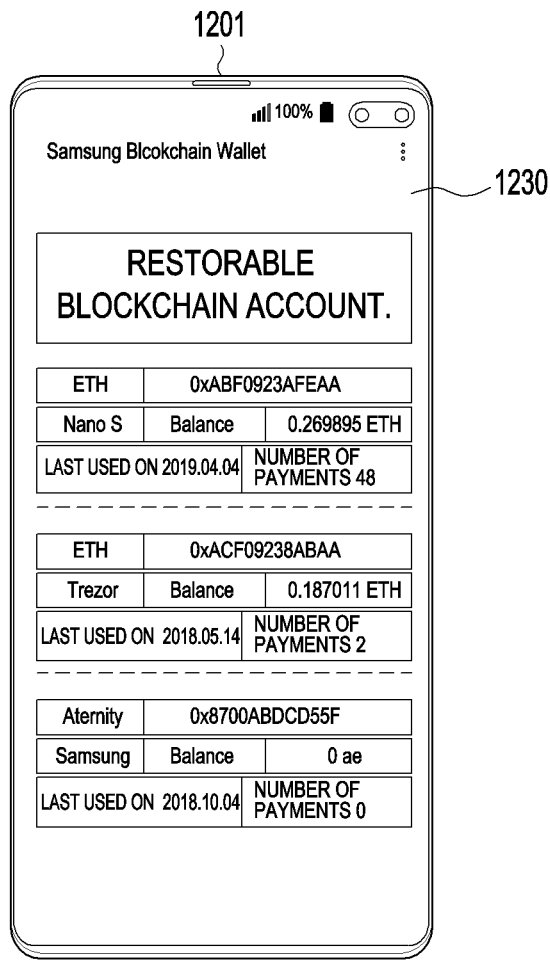

FIGS. 12A, 12B, and 12C illustrate a user interface for describing a method of restoring a blockchain account for a root seed via authentication according to various embodiments of the disclosure.

Referring to FIGS. 12A to 12C, an electronic device 1201 (e.g., the electronic device 201 or 401 of FIG. 2 or 4) may perform the operation of restoring (or updating) the blockchain account. For example, when the blockchain wallet application 450 is executed, the electronic device 1201 may start the operation of restoring (or updating) the blockchain account using the blockchain signature application 410.

Referring to FIGS. 12A and 12B, the electronic device 1201 may perform an authentication operation before restoring (or updating) the blockchain account. For example, the electronic device 1201 may perform the authentication operation via a preset authentication means.

Referring to FIG. 12A, when a pin code has been preset as the authentication means, the electronic device 1201 may display a user interface 1210 to receive the pin code. When the user inputs the pin code to a pin code input window 1215, the electronic device 1201 may compare a pre-registered code with the input pin code, thereby performing the authentication operation. The electronic device 1201 may complete the authentication when the input pin code is the same as the pre-registered pin code.

Referring to FIG. 12B, when biometric information is set as the authentication means, the electronic device 1201 may display a user interface 1220 to receive the biometric information. When the user inputs the biometric information (e.g., fingerprint information) to a biometric information input window 1225, the electronic device 1201 may compare pre-registered biometric information with the input biometric information, thereby performing the authentication operation. The electronic device 1201 may complete the authentication when the input biometric information (e.g., fingerprint information) is the same as the pre-registered biometric information (e.g., fingerprint information).

According to an embodiment, the authentication operation may be performed via a plurality of authentication means. For example, the electronic device 1201 may receive both the pin code and biometric information from the user and may complete the authentication when both the pin code and biometric information received are the same as pre-registered information.

Referring to FIG. 12C, when the authentication is complete, the electronic device 1201 may display a user interface 1230 including information about blockchain accounts that may be restored (or updated). According to an embodiment, the electronic device 201 may provide a screen (not shown) to receive mnemonic words to restore the blockchain account. According to an embodiment, the electronic device 1201 may restore the root seed based on the received mnemonic value and restore the account information, which has been generated based on the hierarchy deterministic (HD) path, based on the restored root seed. The user may restore (or update) the blockchain account using the electronic device 1201 by referring to the information about the blockchain account which may be restored (or updated).

According to an embodiment, an electronic device comprises a display; and a processor configured to generate at least one hierarchy deterministic path, obtain at least one public key using a root seed and the at least one hierarchy deterministic path, obtain a blockchain address for a blockchain account from the at least one public key, obtain information about the blockchain address from a blockchain network based on the blockchain address, the information about the blockchain address including information about a balance of the blockchain account, and display at least part of the information about the blockchain address through the display, based on the information about the balance of the blockchain account.

The at least one hierarchy deterministic path may include at least one factor divided into a plurality of levels. The processor may be configured to generate at least one other hierarchy deterministic path by modifying the at least one factor.

The processor may be configured to obtain a parent public key from the root seed using a first hierarchy deterministic path among the at least one hierarchy deterministic path and obtain at least one child public key from the parent public key using a second hierarchy deterministic path related to the first hierarchy deterministic path.

The processor may be configured to obtain the blockchain address using a child public key of a final step among the at least one child public key.

The first hierarchy deterministic path may include a plurality of factors divided into a plurality of levels. The processor may be configured to obtain the parent public key by modifying a value of each of the plurality of factors.

The second hierarchy deterministic path may include at least one factor divided into at least one level. The processor may be configured to obtain the child public key by modifying a value of the at least one factor.

The processor may be configured to generate the first hierarchy deterministic path using at least one private key obtained through the root seed.

The processor may be configured to send a request for transaction information about the blockchain address to the blockchain network.

The information about the blockchain address may further include at least one of the number of deposits, the number of remittances, an account list, a balance, the number of transactions, a transaction history, latest transaction information, or a maker hint for the blockchain address.

The processor may be configured to restore the blockchain address corresponding to the root seed using pre-registered authentication information.

The processor may be configured to display additional information obtained using the information about the blockchain address, through the display.

According to an embodiment, a method for operating an electronic device comprises generating at least one hierarchy deterministic path, obtaining at least one public key using a root seed and the at least one hierarchy deterministic path, obtaining a blockchain address for a blockchain account from the at least one public key, obtaining information about the blockchain address from a blockchain network based on the blockchain address, the information about the blockchain address including information about a balance of the blockchain account, and displaying at least part of the information about the blockchain address through a display of the electronic device, based on the information about the balance of the blockchain account.

The method may further comprise generating at least one other hierarchy deterministic path by modifying at least one factor divided into a plurality of levels included in the at least one hierarchy deterministic path.

Obtaining the at least one public key may include obtaining a parent public key from the root seed using a first hierarchy deterministic path among the at least one hierarchy deterministic path and obtaining at least one child public key from the parent public key using a second hierarchy deterministic path related to the first hierarchy deterministic path.

Obtaining the blockchain address may include obtaining the blockchain address using a child public key of a final step among the at least one child public key.

According to an embodiment, an electronic device comprises a display and a processor configured to obtain a first public key using a root seed and a first hierarchy deterministic path, obtain a second public key using the first public key and a second hierarchy deterministic path, obtain a blockchain address using the second public key, obtain information about the blockchain address from a blockchain network based on the blockchain address, the information about the blockchain address including information about a balance of the blockchain address, and provide at least one of the information about the blockchain address through the display, based on the information about the balance of the blockchain address.

The second hierarchy deterministic path may include at least one factor divided into at least one level. The processor may be configured to obtain the second public key by modifying a value of the at least one factor.

The processor may be configured to generate the first hierarchy deterministic path using at least one private key obtained through the root seed.

According to an embodiment, an electronic device comprises a display and a processor configured to generate at least one first hierarchy deterministic path that may be derived from a root seed, obtain at least one first public key from the root seed, using the at least one first hierarchy deterministic path, transmit the at least one first public key to a server to obtain at least one blockchain address for a blockchain account from the at least one first public key, obtain information about the blockchain account corresponding to the at least one blockchain address from the server, and display at least part of the information about the blockchain account through the display.

The at least one blockchain address may be identified based on at least one second public key generated from the at least one first public key using at least one second hierarchy deterministic path related to the at least one first hierarchy deterministic path by the server.

Each of the aforementioned components of the electronic device may include one or more parts, and a name of the part may vary with a type of the electronic device. The electronic device in accordance with various embodiments of the disclosure may include at least one of the aforementioned components, omit some of them, or include other additional component(s). Some of the components may be combined into an entity, but the entity may perform the same functions as the components may do.

As is apparent from the foregoing description, according to various embodiments of the disclosure, the electronic device may provide blockchain account information for a root seed even without selection of a hierarchy deterministic path directly by the user when the schemes of the hierarchy deterministic path for deriving the public key corresponding to the blockchain account from the root seed differ from each other.

While the disclosure has been shown and described with reference to various embodiments thereof, it will be understood by those skilled in the art that various changes in form and details may be made therein without departing from the spirit and scope of the disclosure. Accordingly, the scope of the disclosure as defined by the appended claims and their equivalents.

What is claimed is:

1. An electronic device, comprising:
a display;
a processor; and
memory storing instructions that, when executed by the processor, cause the electronic device to:
generate a plurality of hierarchy deterministic paths for a root seed stored in the memory, the plurality of hierarchy deterministic paths including paths with different levels, wherein the plurality of hierarchy deterministic paths include a first hierarchy deterministic path that corresponds to an area derivable only with a private key obtained from the root seed,
obtain at least one public key, using the root seed and at least one hierarchy deterministic path of the plurality of hierarchy deterministic paths, the at least one hierarchy deterministic path including the first hierarchy deterministic path,
obtain a blockchain address for a blockchain account from the at least one public key,
obtain information about the blockchain address from a blockchain network based on the blockchain address, the information about the blockchain address including information about a balance of the blockchain account,
identify whether the blockchain address is a valid account in the blockchain network, and
when the blockchain address is identified as the valid account in the blockchain network, display at least part of the information about the blockchain address through the display, based on the information about the balance of the blockchain account,
wherein the at least part of the information about the blockchain address includes information about a maker of the blockchain account based on levels of the plurality of hierarchy deterministic paths.

2. The electronic device of claim 1,
wherein the at least one hierarchy deterministic path includes at least one factor divided into a plurality of levels, and
wherein the instructions that, when executed by the processor, cause the electronic device to generate at least one other hierarchy deterministic path by modifying the at least one factor.

3. The electronic device of claim 1, wherein the instructions that, when executed by the processor, cause the electronic device to:
obtain a parent public key from the root seed using the first hierarchy deterministic path among the plurality of hierarchy deterministic paths, and
obtain at least one child public key from the parent public key using a second hierarchy deterministic path related to the first hierarchy deterministic path.

4. The electronic device of claim 3, wherein the instructions that, when executed by the processor, cause the electronic device to obtain the blockchain address using a child public key of a final step among the at least one child public key.

5. The electronic device of claim 3,
wherein the first hierarchy deterministic path includes a plurality of factors divided into a plurality of levels, and
wherein the instructions that, when executed by the processor, cause the electronic device to obtain the parent public key by modifying a value of each of the plurality of factors.

6. The electronic device of claim 3,
wherein the second hierarchy deterministic path includes at least one factor divided into at least one level, and
wherein the instructions that, when executed by the processor, cause the electronic device to obtain the child public key by modifying a value of the at least one factor.

7. The electronic device of claim 3, wherein the instructions that, when executed by the processor, cause the electronic device to generate the first hierarchy deterministic path by using at least one private key obtained through the root seed.

8. The electronic device of claim 1, wherein the instructions that, when executed by the processor, cause the electronic device to send a request for transaction information about the blockchain address to the blockchain network.

9. The electronic device of claim 1, wherein the information about the blockchain address further includes at least one of a number of deposits, a number of remittances, an account list, a balance, a number of transactions, a transaction history, latest transaction information, or a maker hint for the blockchain address.

10. The electronic device of claim 1, wherein the instructions that, when executed by the processor, cause the electronic device to restore the blockchain address corresponding to the root seed by using pre-registered authentication information.

11. The electronic device of claim 1, wherein the instructions that, when executed by the processor, cause the electronic device to display additional information obtained using the information about the blockchain address, through the display.

12. The electronic device of claim 1, wherein the information about the blockchain address includes blockchain account information for the root seed.

13. A method for operating an electronic device, the method comprising:
    generating a plurality of hierarchy deterministic paths for a root seed stored in the electronic device, the plurality of hierarchy deterministic paths including paths with different levels, wherein the plurality of hierarchy deterministic paths include a first hierarchy deterministic path that corresponds to an area derivable only with a private key obtained from the root seed;
    obtaining at least one public key, using the root seed and at least one hierarchy deterministic path of the plurality of hierarchy deterministic paths, the at least one hierarchy deterministic path including the first hierarchy deterministic path;
    obtaining a blockchain address for a blockchain account from the at least one public key;
    obtaining information about the blockchain address from a blockchain network based on the blockchain address, the information about the blockchain address including information about a balance of the blockchain account;
    identify whether the blockchain address is a valid account in the blockchain network; and
    when the blockchain address is identified as the valid account in the blockchain network, displaying at least part of the information about the blockchain address through a display of the electronic device, based on the information about the balance of the blockchain account,
    wherein the at least part of the information about the blockchain address includes information about a maker of the blockchain account based on levels of the plurality of hierarchy deterministic paths.

14. The method of claim 13, further comprising:
    generating at least one other hierarchy deterministic path by modifying at least one factor divided into a plurality of levels included in the at least one hierarchy deterministic path.

15. The method of claim 13, wherein the obtaining of the at least one public key comprises:
    obtaining a parent public key from the root seed using the first hierarchy deterministic path among the plurality of hierarchy deterministic paths; and
    obtaining at least one child public key from the parent public key using a second hierarchy deterministic path related to the first hierarchy deterministic path.

16. The method of claim 15, wherein the obtaining of the blockchain address includes obtaining the blockchain address using a child public key of a final step among the at least one child public key.

17. An electronic device, comprising:
    a display;
    a processor; and
    memory storing instructions that, when executed by the processor, cause the electronic device to:
    obtain a first public key using a root seed stored in the memory and a first hierarchy deterministic path among a plurality of hierarchy deterministic paths generated for the root seed, wherein the plurality of hierarchy deterministic paths include paths with different levels, and wherein the first hierarchy deterministic path corresponds to an area derivable only with a private key obtained from the root seed,
    obtain a second public key using the first public key and a second hierarchy deterministic path among the plurality of hierarchy deterministic paths,
    obtain a blockchain address using the second public key,
    obtain information about the blockchain address from a blockchain network based on the blockchain address, the information about the blockchain address including information about a balance of the blockchain address,
    identify whether the blockchain address is a valid account in the blockchain network, and
    when the blockchain address is identified as the valid account in the blockchain network, provide at least one of the information about the blockchain address through the display, based on the information about the balance of the blockchain address,
    wherein the at least one of the information about the blockchain address includes information about a maker of the blockchain account based on levels of the plurality of hierarchy deterministic paths.

18. The electronic device of claim 17,
wherein the second hierarchy deterministic path includes at least one factor divided into at least one level, and
wherein the instructions that, when executed by the processor, cause the electronic device to obtain the second public key by modifying a value of the at least one factor.

19. The electronic device of claim 17, wherein the instructions that, when executed by the processor, cause the electronic device to generate the first hierarchy deterministic path by using at least one private key obtained through the root seed.

20. An electronic device, comprising:
    a display;
    a processor; and memory storing instructions that, when executed by the processor, cause the electronic device to:

generate a plurality of hierarchy deterministic paths including at least one first hierarchy deterministic path, the plurality of hierarchy deterministic paths being derived from a root seed stored in the memory, wherein the plurality of hierarchy deterministic paths include paths with different levels, and wherein the at least one first hierarchy deterministic path corresponds to an area derived only with a private key obtained from the root seed, obtain at least one first public key from the root seed, using the at least one first hierarchy deterministic path, transmit the at least one first public key to a server to obtain at least one blockchain address for a blockchain account from the at least one first public key, obtain information about the blockchain account corresponding to the at least one blockchain address from the server, identify whether the blockchain address is a valid account in a blockchain network, and when the blockchain address is identified as the valid account in the blockchain network, display at least part of the information about the blockchain account through the displays, wherein the at least part of the information about the blockchain account includes information about a maker of the blockchain account based on levels of the plurality of hierarchy deterministic paths.

21. The electronic device of claim 20, wherein the at least one blockchain address is identified based on at least one second public key generated from the at least one first public key by using at least one second hierarchy deterministic path related to the at least one first hierarchy deterministic path by the server.

* * * * *